United States Patent
Tomimatsu et al.

(10) Patent No.: US 7,200,506 B2
(45) Date of Patent: Apr. 3, 2007

(54) METHOD FOR FAILURE ANALYSIS AND SYSTEM FOR FAILURE ANALYSIS

(75) Inventors: Satoshi Tomimatsu, Kokubunji (JP); Hiroyasu Shichi, Tokyo (JP); Muneyuki Fukuda, Kokubunji (JP); Kaoru Umemura, Musashino (JP)

(73) Assignee: Hitachi High-Technologies Corporation, Tokyo (JP)

( * ) Notice: Subject to any disclaimer, the term of this patent is extended or adjusted under 35 U.S.C. 154(b) by 491 days.

(21) Appl. No.: 10/339,356

(22) Filed: Jan. 10, 2003

(65) Prior Publication Data

US 2003/0236586 A1 Dec. 25, 2003

(30) Foreign Application Priority Data

Jun. 25, 2002 (JP) ............................. 2002-184113

(51) Int. Cl.
*G01N 37/00* (2006.01)
(52) U.S. Cl. ..................... 702/81; 702/183; 250/309
(58) Field of Classification Search .................. 702/83
See application file for complete search history.

(56) References Cited

U.S. PATENT DOCUMENTS

| | | | | |
|---|---|---|---|---|
| 5,153,818 A | * | 10/1992 | Mukougawa et al. | 361/737 |
| 5,844,416 A | * | 12/1998 | Campbell et al. | 324/750 |
| 6,199,059 B1 | * | 3/2001 | Dahan et al. | 707/3 |
| 6,753,538 B2 | * | 6/2004 | Musil et al. | 250/492.2 |
| 2002/0166976 A1 | * | 11/2002 | Sugaya et al. | 250/440.11 |
| 2003/0169060 A1 | * | 9/2003 | Shinada et al. | 324/751 |
| 2003/0206027 A1 | * | 11/2003 | Nozoe et al. | 324/751 |

FOREIGN PATENT DOCUMENTS

| | | |
|---|---|---|
| JP | 5-52721 | 3/1993 |
| JP | 07-302826 | 11/1995 |
| JP | 11-265679 | 9/1999 |
| JP | 2000-156393 | 6/2000 |

OTHER PUBLICATIONS

Material Research Society, Symposium Proceedings, vol. 480, 1997, pp. 19-27.
Proceedings of the 22nd International Symposium for Testing and Failure Analysis, Nov. 18-22, 1996, pp. 199-205.

* cited by examiner

*Primary Examiner*—Manuel L. Barbee
(74) *Attorney, Agent, or Firm*—Mattingly, Stanger, Malur & Brundidge, P.C.

(57) ABSTRACT

After completion of an arbitrary device process, an apparatus for micro-sample extraction extracts a part of a wafer as a micro-sample of a size equal to or larger than a repetition pattern with a probe and places the extracted micro-sample to a micro-sample storage, and the micro-sample storage is stored into an apparatus for micro-sample storage. The wafer is subjected to a post process and an observation desired position is determined in response to a failure analysis requirement. After that, the micro-sample is unloaded from the micro-sample storage by an apparatus for additional processing of the micro-sample and is placed onto an observation sample holder. By performing an additional process in the observation desired position, a failure analysis sample is prepared, and analysis information obtained by an apparatus for failure analysis is output.

4 Claims, 29 Drawing Sheets

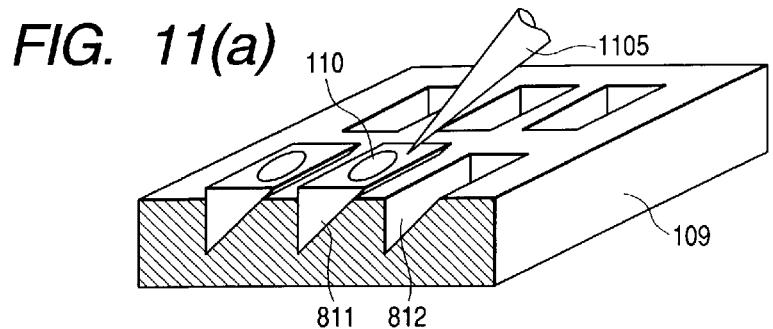
FIG. 11(a)
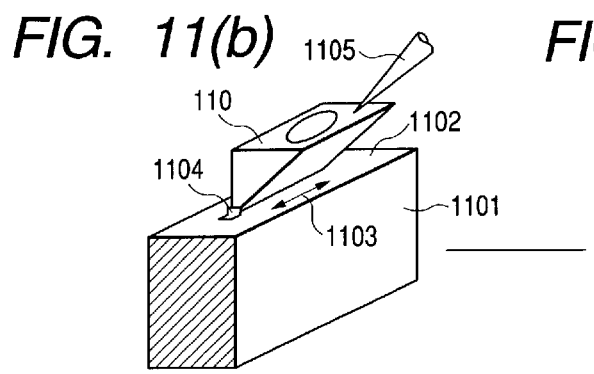 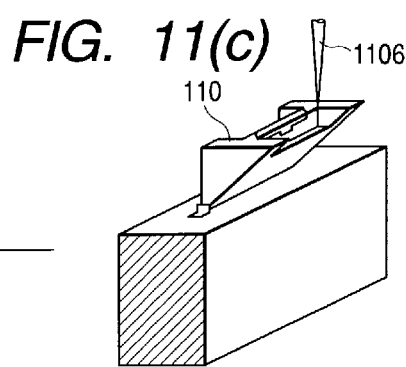
FIG. 11(b)    FIG. 11(c)
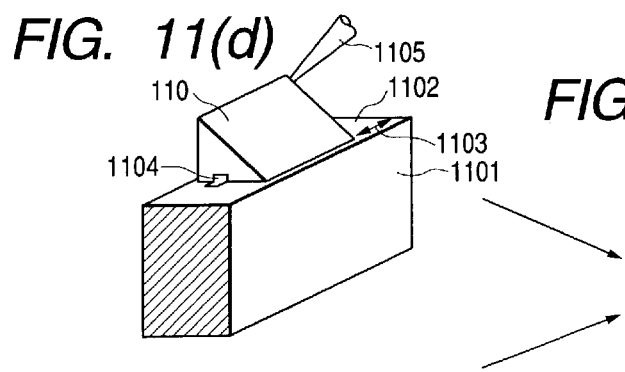 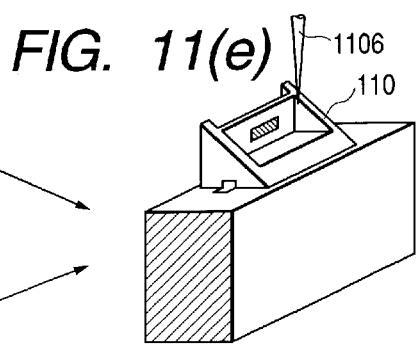
FIG. 11(d)    FIG. 11(e)
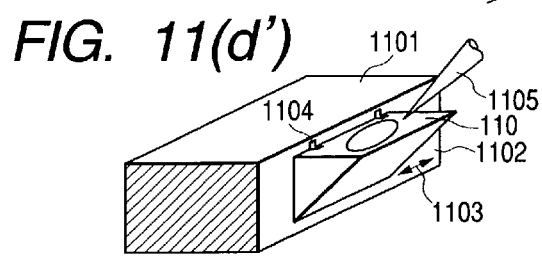
FIG. 11(d')

METHOD FOR FAILURE ANALYSIS AND SYSTEM FOR FAILURE ANALYSIS

BACKGROUND OF THE INVENTION

The present invention relates to a failure analysis technique for analyzing a failure of an electronic device or the like.

In fabrication of electronic devices such as a semiconductor memory typified by a dynamic random access memory (DRAM), a microprocessor, a semiconductor device such as a semiconductor laser, and a magnetic head, a high production yield is demanded.

Reduction in the product yield due to occurrence of a failure causes deterioration in profitability. Consequently, it is a big task to find a defect, a foreign matter, and poor processing as causes of a failure early and to take a countermeasure early. For example, at a manufacturing site of a semiconductor device, energies are put into early finding of a failure by a careful inspection and analysis of the cause of the failure. In a process of manufacturing actual electron devices using a wafer, a wafer in a process is inspected, the cause of an abnormal part such as a defect in a circuit pattern or a foreign matter is pursued, and a countermeasure is examined.

Usually, a high-resolution scanning electron microscope (hereinbelow, abbreviated as SEM) is used for observing a fine structure of a sample. As the packing density of a semiconductor increases, it is becoming impossible to observe an object with the resolution of the SEM, and a transmission electron microscope (hereinbelow, abbreviated as TEM) having a higher observation resolution is used in place of the SEM.

Preparation of a conventional sample for TEM accompanies a work of extracting a small piece from a sample substrate by cleavage, cutting, or the like. In the case where a sample substrate is a wafer, in most cases, the wafer has to be cut.

Recently, there is an example of using a processing method of irradiating a sample substrate with an ion beam and applying the action that particles constructing the sample substrate are discharged from the sample substrate by a sputtering action, that is, a focused ion beam (hereinbelow, abbreviated as FIB) process.

According to the method, first, a rectangular-shaped pellet having a thickness of sub-millimeters including an area to be observed is cut out from a sample substrate such as a wafer by using a dicer or the like. Subsequently, a part of the rectangular-shaped pellet is processed with an FIB into a thin film form, thereby obtaining a TEM sample. The feature of the FIB-processed sample for TEM observation is that a part of a sample piece is processed to a thin film having a thickness of about 100 nm so as to be observed by the TEM. Although the method enables a desired observation part to be positioned with precision of a micrometer level and observed, the wafer still has to be cut.

As described above, although the advantage of monitoring a result of a process during fabrication of a semiconductor device or the like is big from the viewpoint of yield management, a wafer is cut for preparing a sample and pieces of the wafer do not go to the following process but are discarded. Particularly, in recent years, the diameter of a wafer is increasing in order to lower the unit price of fabricating a semiconductor device. To be specific, the number of semiconductor devices which can be fabricated from one wafer is increased, thereby reducing the unit price. However, in other words, the price of a wafer increases and the number of semiconductor devices which are lost by discarding a wafer also increases. Therefore, the conventional inspection method including cutting of a wafer is very uneconomical.

Addressing the problem, there is a method capable of obtaining a sample without cutting a wafer. The method is disclosed in Japanese Patent Application Laid-Open No. 05-52721 (prior art 1).

According to the method, as shown in FIGS. 2(a) to 2(g), the posture of a specimen substrate 202 is kept so that the surface of the specimen substrate 202 is irradiated with an FIB 201 at the right angle, and a rectangular area in the surface of the specimen substrate 202 is scanned with the FIB 201, thereby forming a rectangular hole 207 having a required depth in the surface of the sample (FIG. 2(a)). After that, the specimen substrate 202 is tilted and a bottom hole 208 is formed. The tilt angle of the specimen substrate 202 is changed by a specimen stage (not shown) (FIG. 2(b)). The posture of the specimen substrate 202 is changed to set the specimen substrate 202 so that the surface of the specimen substrate 202 becomes perpendicular to the FIB 201 again, and a trench 209 is formed (FIG. 2 (c)). A manipulator (not shown) is driven to make the tip of a probe 203 at the end of the manipulator come into contact with a part to be extracted from the specimen substrate 202 (FIG. 2(d)). Subsequently, while supplying a deposition gas 205 from a gas nozzle 210, an area including the tip portion of the probe 203 is locally irradiated with the FIB 201, thereby forming an ion beam gas assisted deposition film 204. The separation part in the specimen substrate 202 and the tip of the probe 203 which are in contact with each other are connected by the ion beam assisted deposition layer 204 (FIG. 2(e)). The remaining part is cut with the FIB 201 (FIG. 2(f)) and a micro-sample 206 as an extracted sample is cut out from the specimen substrate 202. The cut-out micro-sample 206 is supported by the probe 203 connected (FIG. 2(g)).

The micro sample 206 is processed with the FIB 201 and an area to be observed is thinned, thereby obtaining a TEM sample (not shown). By introducing the micro-sample separated by the method into any of various analyzers, analysis can be conducted.

The above method is an example of extracting a micro-sample by a sample preparing apparatus and there is also a method of processing the shape of a sectional sample thin film, taking a specimen substrate from the sample preparing apparatus, and a sectional sample thin film is extracted by another mechanism in atmosphere. For example, a method is disclosed in "Material Research Society, Symposium Proceedings", vol. 480, 1997, pp. 19 to 27 (prior art 2). Similarly, a method is disclosed in "Proceedings of the 22nd International Symposium for Testing and Failure Analysis, 18–22 November 1996", pp. 199 to 205 (prior art 3).

As shown in FIG. 3(a), a section sample membrane 307 is formed while processing both sides of a target position on a wafer 308 in a stair shape with an FIB 301. Subsequently, by tilting a sample stage, the angle formed between the FIB 301 and the surface of the specimen is changed and the specimen substrate is irradiated with the FIB 301. As shown in FIG. 3(b), the peripheral portion of the sample membrane 307 is cut away by using the FIB 301 and the sample membrane 307 is separated from the wafer 308. The wafer 308 is taken out from an FIB apparatus, a glass stick is allowed to approach the process portion in the atmosphere, by using static electricity, the sample membrane 307 is absorbed by the glass stick and taken out from the wafer. The glass stick is moved to a mesh 309 and is either adsorbed by the mesh 309 by static electricity or disposed so that a surface to be processed faces a transparent adhesion member. In such a manner, without taking out the processed sample membrane in the system, even when most of the outer shape of the sample membrane is processed with an ion beam, by introducing the separated sample membrane into a TEM, analysis can be made.

A device manufacturing method in which a method similar to the prior art 1 for process management is disclosed in, for example, Japanese Patent Application Laid-Open No. 2000-156393 (prior art 4).

According to the method, process management is performed by a flow as shown in FIG. 4. A lot 401 is subjected to a process ml. After completion of the process ml, a predetermined number of wafers are selected as wafers 402 for inspection from the lot 401 and the other wafers 403 enter a standby mode. An area 404 for inspection in the selected wafer 402 for inspection is extracted as a micro-sample 405. The wafer 402 for inspection from which the micro-sample 405 is extracted is put together with the other wafers 403 again and the wafers as a lot 401A are subjected to the following process m2. The micro-sample 405 is processed so as to be used in one of analysis apparatus 406 and is transmitted to the analysis apparatus 406 where a target area in the micro-sample 405 is analyzed. A result of analysis is sent to a computer 407 and stored as a data base. The stored data base is transmitted as necessary via a communication path "h" to the process m1 or m2 and an instruction of a change in the process conditions or the like is given.

It is a big feature that a wafer is passed through paths a, b, c, and d from the process m1 to the process m2 and, during the paths, a micro sample for analysis is extracted. The number of sample substrates does not decrease for the inspection. The number of wafers in the lot 401 subjected to the process m1 and the number of wafers in the lot 401 subjected to the process m2 are the same. Consequently, there are no semiconductor devices which are lost due to cutting of the wafer. The total manufacture yield of semiconductor devices is increased and the manufacturing cost can be reduced.

In a failure analysis, when a failure mode is found by another tester such as a probe tester or an EB tester, a process causing the failure is clarified. The main target of the failure analysis in the invention is not only a failure existing only in a specific position in a wafer but also a failure existing in an entire face of a wafer or in an area of a certain range due to a process as a basic cause.

When a desired area is determined after a failure is detected by a test and a sample of observation and analysis is prepared by using means as employed in the prior arts 1, 2, and 3 in a procedure for failure analysis, the following problems remain.

Even if an abnormal part can be found in the observation sample prepared after device formation, there is a case that the process as a cause cannot be found in some cases. An example of the case will be described by referring to FIGS. 5(a) to 5(d).

FIG. 5(a) shows a cross section of a device on which a wiring process has been completed. In this example, formation of a metal line by a dual damascene process is shown. A metal line 501 is formed in a hole area for a line opened in an insulator layer 502. At this time point, the metal line 501 is normally formed. In the following process of forming a cap layer 503, heat treatment of about 300 to 400° C. is performed. In some cases, as shown in FIG. 5(b), a defect area 504 is formed in a connection hole part in the metal line 501 due to the heat treatment. Even in the case where no failure occurs in FIG. 5(b), there is a case that the defect area 504 occurs due to heat treatment of 400 to 500° C. at the time of forming an insulator layer 505 shown in FIG. 5(c).

However, in the case where after completion of a final process, for example, breaking of wire or a high-resistance part is found by a probe test, an area to be observed is determined, a section is formed by a method as described in the prior arts 1 to 3, and a wiring process is examined, although the defect area 504 as shown in FIG. 5(d) is observed, it is very difficult to clarify a process as a direct cause of the defect. Consequently, it is very important to clarify the cause from information which does not exert an influence by a later process.

An area to be monitored is preliminarily determined in the prior art 4, so that it is very effective for a process monitor for processing the area into a thin film or cross section to be observed. However, in order to use the area for failure analysis, the following problems occur.

In the failure analysis, an area for observation and analysis cannot be preliminarily specified. Consequently, if a micro-sample is extracted after completion of each process or a plurality of processes, and preliminarily processed as a TEM sample or the like, in the case where an area to be observed is determined in a later inspection and the area is different from the position of the prepared TEM sample, the possibility that the desired area has disappeared already is high, and the desired area cannot be observed. In the case of failure analysis, not only the position but also the direction of a face which is desired to be observed are also important. For example, in the case of a DRAM, there can be directions of sections parallel to and perpendicular-to a word line, a face parallel to the surface of a specimen, and the like. In consideration of combinations of the positions and directions, the possibility that the position of the prepared TEM specimen (or position of other cross sections for observation and analysis) coincides with the desired area of failure analysis is very low. Consequently, in the failure analysis, it is necessary to process the area for observation and analysis which is determined on the basis of failure data obtained after an inspection.

SUMMARY OF THE INVENTION

The present invention has been achieved in consideration of the problems and its object is to provide a failure analysis technique capable of assuring a sample to be observed in an arbitrary observation-desired position determined later by a test in analysis of a failure in a device or the like.

In order to achieve the object, in the present invention, a micro-sample (or sample) is extracted and stored every after a predetermined process, and an additional process is performed on the micro-sample in an observation and analysis position determined on the basis of failure data derived later. The basic configuration of a system for failure analysis of the invention includes: an apparatus for micro-sample extraction (or an apparatus for sample extraction) for extracting, as a sample, a part of a substrate by using a processing beam each time an arbitrary process for forming a desired pattern on the substrate is finished; an apparatus for micro-sample storage (or an apparatus for sample storage) for storing the sample extracted; an apparatus for filing data of stored-sample for controlling management information regarding said sample as a data base; an apparatus for additional processing micro-sample (or an apparatus for additional processing sample) for processing the sample stored into a form which can be analyzed in response to a failure analysis request; and an apparatus for failure analysis for analyzing the sample processed.

Typical configuration examples of the system for failure analysis according to the invention will be described hereinbelow.

(1) A system for failure analysis includes: an apparatus for sample extraction for extracting, as a sample, a part of a substrate by an ion beam process each time an arbitrary process for forming a desired pattern on the substrate is finished and carrying the sample to a sample storage (or a micro-sample storage) for storing the sample; an apparatus for filing data of a stored sample for constructing a data base in which at least product name of the substrate, substrate name, and process name are associated with a storage position of the sample; an apparatus for sample storage for storing the sample storage in correspondence with the data base of the apparatus for filing data of the sample; an apparatus for additional processing micro-sample for taking out the selected sample from the sample storage and performing an additional process on the basis of additional process information; and an apparatus for failure analysis for analyzing the sample subjected to the additional process.

With the configuration, the cause of a failure which is found in a post process can be specified in a past process, so that the cause can be clarified efficiently.

(2) A system for failure analysis includes: an apparatus for sample extraction for extracting, as a sample, a part of a substrate by an ion beam process after each of two or more different processes for forming a desired circuit pattern on the substrate, and carrying the sample to a sample storage for storing the sample; an apparatus for filing data of a stored sample for constructing a data base in which at least product name of the substrate, substrate name, and process name are associated with a storage position of the sample; an apparatus for sample storage for storing the sample storage in accordance with the data base of the apparatus for filing data of the sample and selecting the sample corresponding to arbitrary product designation after completion of the product of the sample; an apparatus for additional processing micro-sample for taking out the sample selected in response to a failure analysis request and performing an additional process on the basis of additional process information; and an apparatus for failure analysis for analyzing the sample subjected to the additional process.

With the configuration, the cause of a failure in a failure device found after shipment of a product can be specified, and it is effective for explanation to the customer.

(3) The system for failure analysis with the configuration is characterized in that the apparatus for sample storage stores the sample storage in correspondence with the data base of the apparatus for filing data of stored-sample and selects the sample corresponding to the substrate determined as defective on the basis of a preset threshold in a failure inspection performed after at least two processes. Further, the system for failure analysis is characterized by further including an apparatus for filing a data base of failures for filing data of observation or analysis of the structure of the sample obtained from the apparatus for failure analysis as failure sample data in correspondence with a process parameter of the process.

Consequently, a process parameter in which a failure often occurs can be easily specified, so that the direction of setting a parameter by an advanced process control can be limited and the efficiency is increased.

(4) The system for failure analysis with the configuration is characterized by further including an ion beam control system for controlling the ion beam process, and the ion beam control system sets the size of the sample to be extracted to be larger than a repetition interval of circuit patterns formed on the substrate.

Consequently, failure analysis can be conducted in an arbitrary position in a device pattern by an additional process which is performed later.

(5) The system for failure analysis with the configuration is characterized in that the sample storage has a readable/writable IC memory storing a data base in which at least product name of the substrate, substrate name, and process name are associated with a storage position of the sample.

With the configuration, process history and the micro-sample position can be easily associated with each other.

(6) The system for failure analysis with the configuration is characterized in that the sample storage has a non-contact IC chip storing a numerical value by which a data base and the sample are associated with each other in a one-to-one corresponding manner, the data base in which at least product name of the substrate, substrate name, and process name are associated with a storage position of the sample.

With the configuration, the process history and the micro-sample can be easily associated with each other in a one-to-one manner.

(7) The system for failure analysis with the configuration is characterized in that the apparatus for sample extraction and the apparatus for sample storage, or the apparatus for sample storage and the apparatus for additional processing sample can be connected to each other so that the sample storage can be received/transmitted without being exposed to the atmosphere.

With the configuration, contamination of a micro-sample is suppressed and the reliability of failure analysis is improved.

(8) The system for failure analysis with the configuration is characterized in that the material for forming the sample storage is silicon.

With the configuration, contamination of a micro-sample is suppressed in a device in which a substrate is made of silicon, so that reliability of failure analysis is improved.

(9) The system for failure analysis with the. configuration is characterized in that the apparatus for processing has an ion beam marking function for marking the sample to make extraction coordinates obvious before extraction of the sample.

With the configuration, coordinates corresponding to the original substrate of a micro-sample after extraction can be easily identified.

BRIEF DESCRIPTION OF THE DRAWINGS

FIGS. 11(a) to 11(e) are diagrams for explaining an example of extraction of a micro-sample from a micro-sample storage and an additional process.

DETAILED DESCRIPTION OF THE PREFERRED EMBODIMENTS

Embodiments of the present invention will be described in detail hereinbelow with reference to the drawings.

Figure 1:
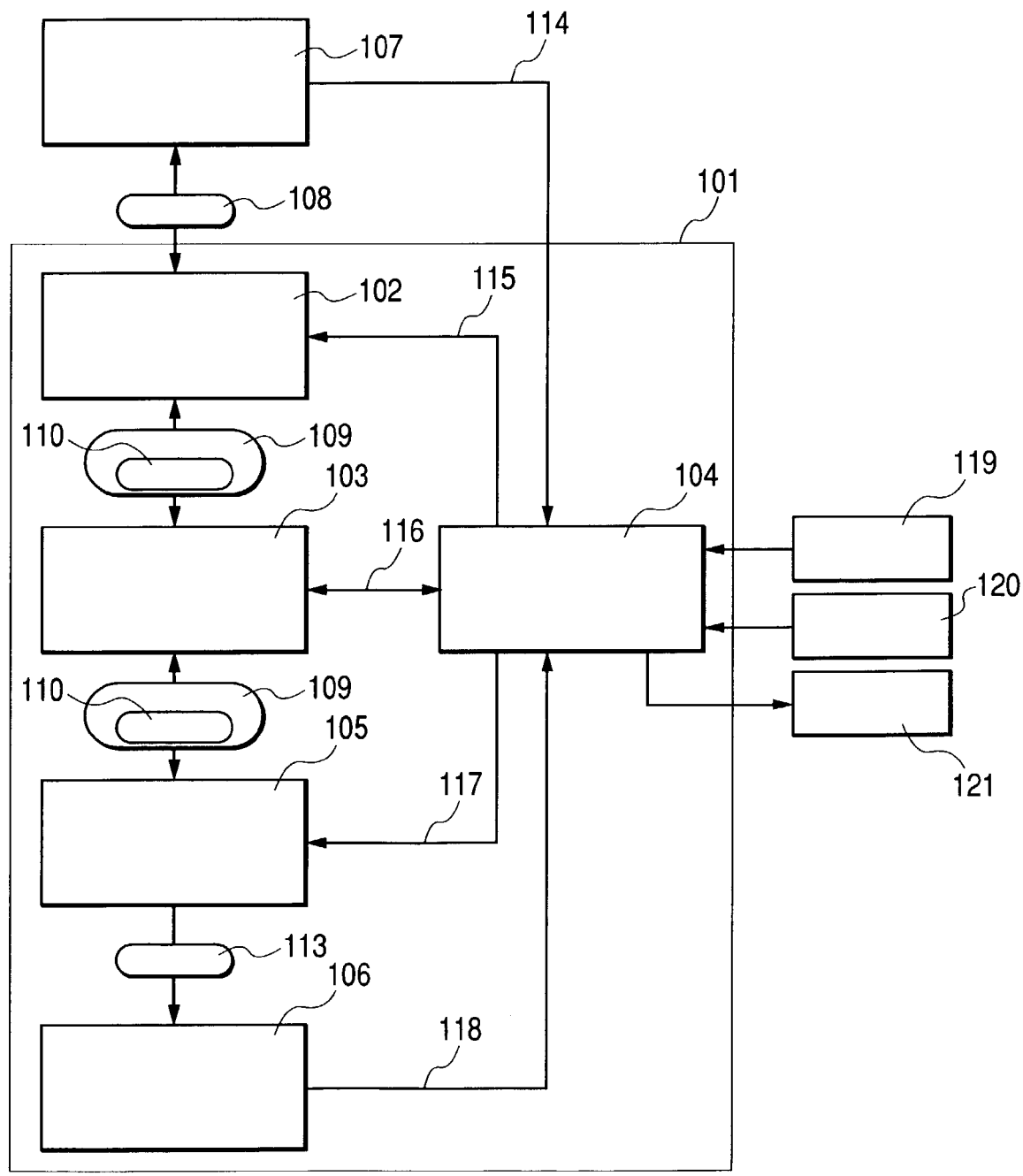
FIG. 1 is a diagram for explaining a general configuration of a system for failure analysis according to the invention.
Figure 2A:
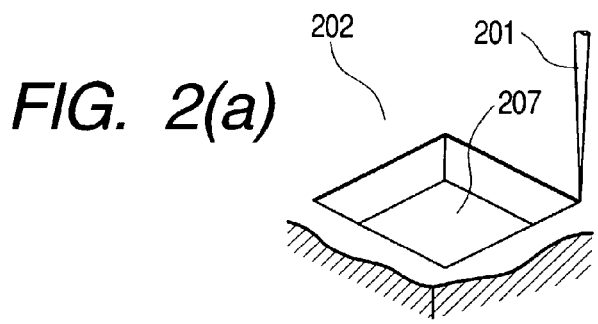
FIGS. 2(a) to 2(g) are diagrams for explaining a conventional sample separating method (prior art 1).
Figure 2B:
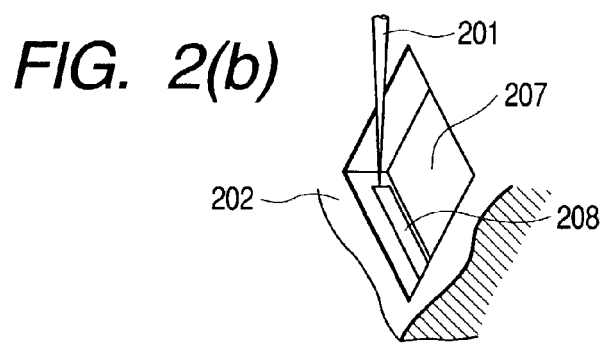
Figure 2C:
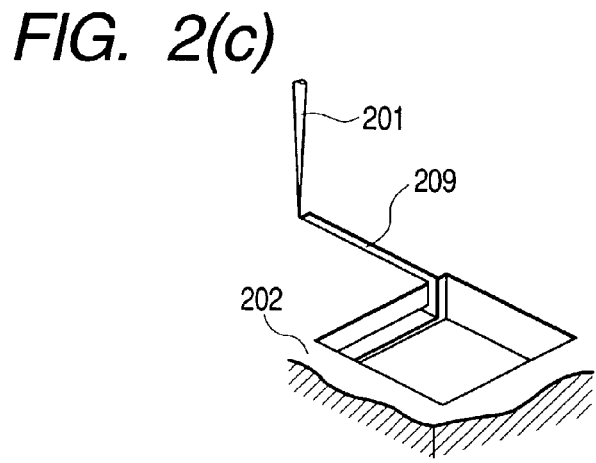
Figure 2D:
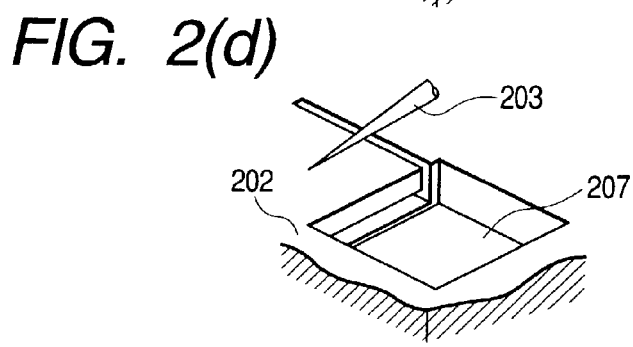
Figure 2E:
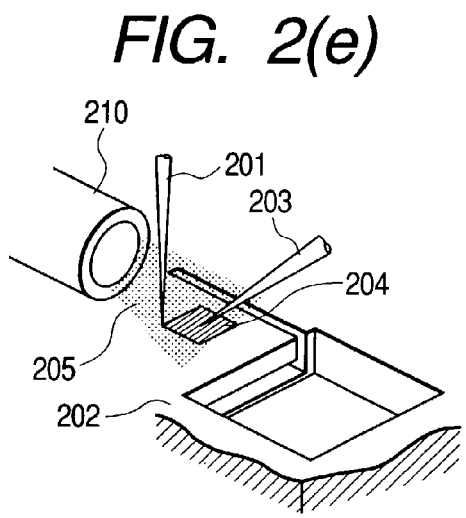
Figure 2F:
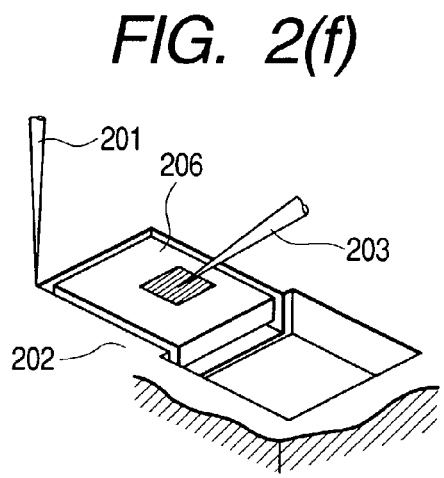
Figure 2G:
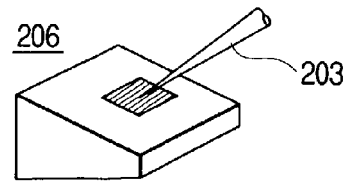
Figure 3A:
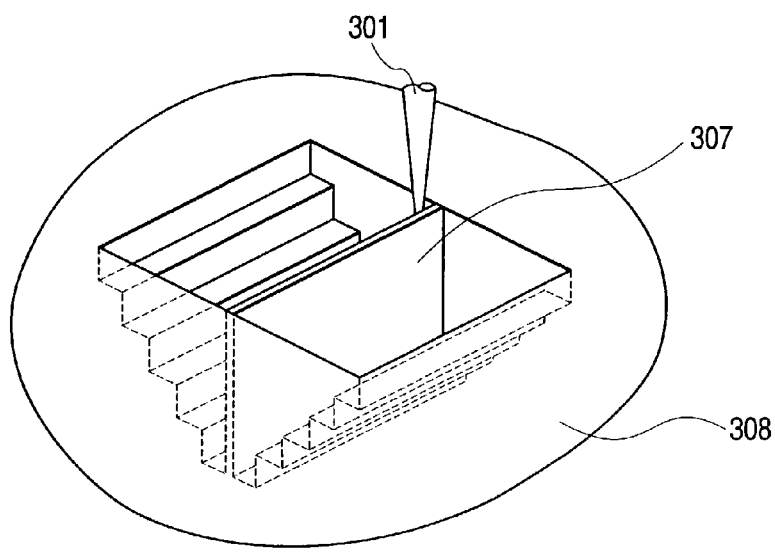
FIGS. 3(a) and 3(b) are diagrams for explaining conventional sample separating methods (prior arts 2 and 3).
Figure 3B:
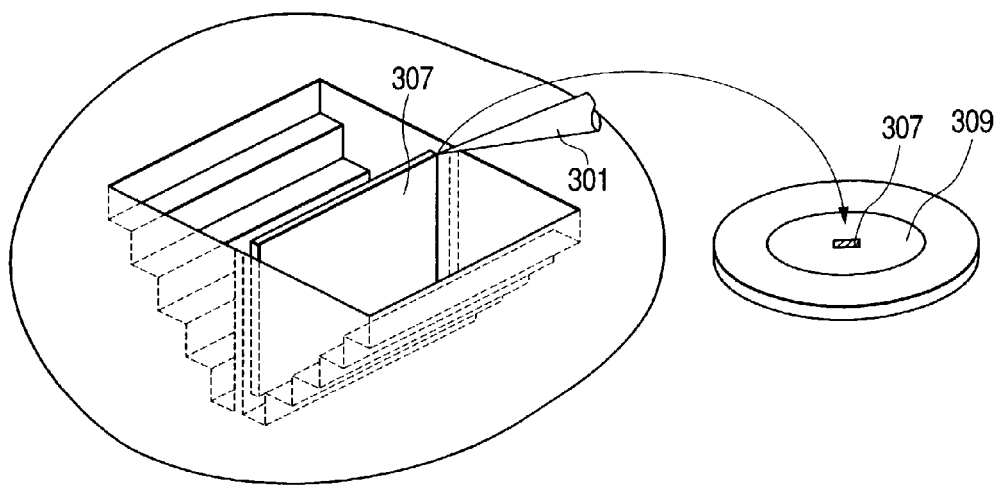
Figure 4:
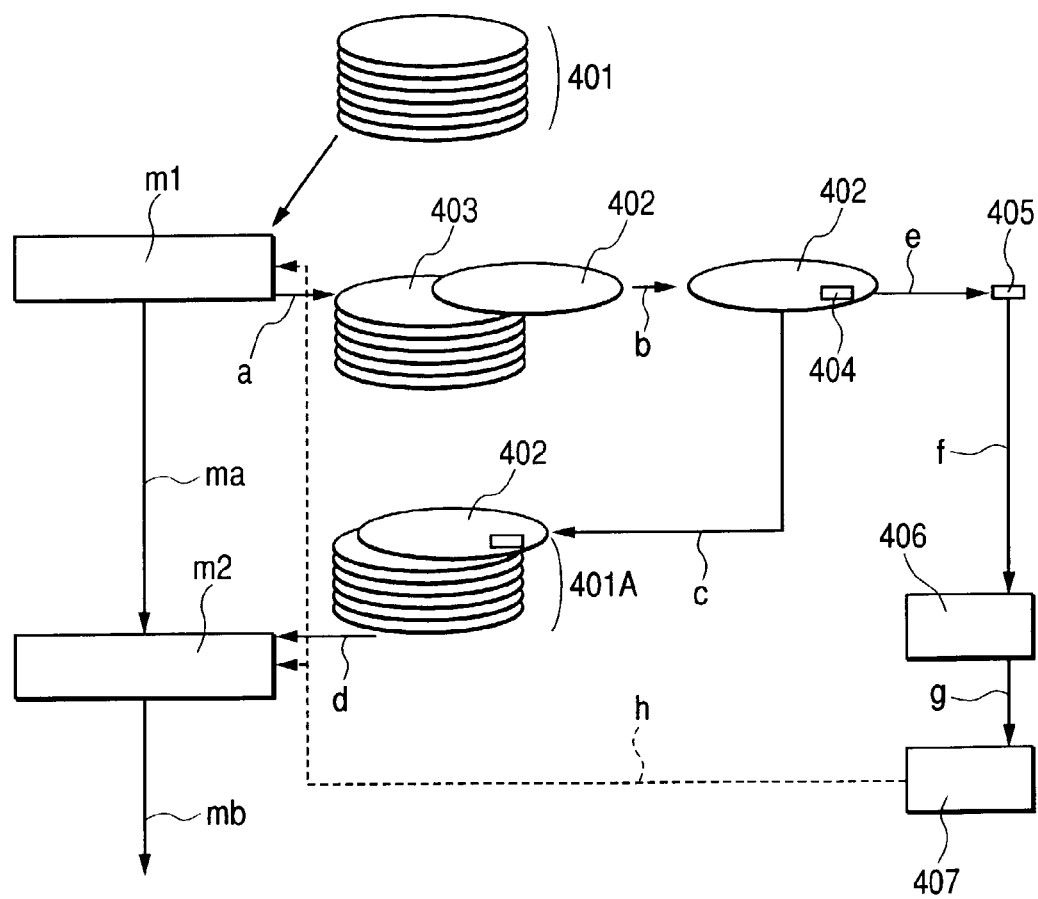
FIG. 4 is a diagram for explaining a conventional method of extracting a micro-sample every process ( prior art 4).
Figure 5A:
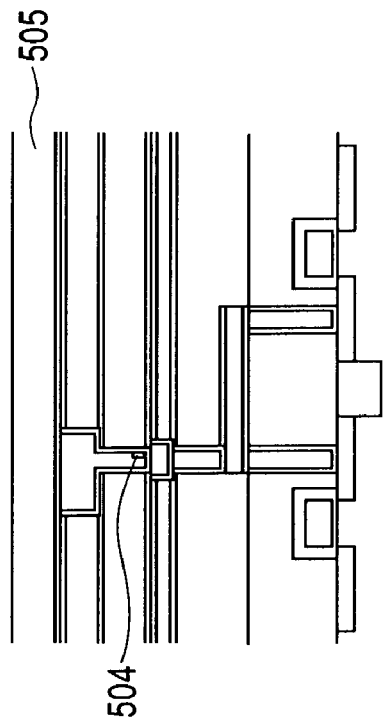
FIGS. 5(a) to 5(d) are diagrams for explaining an influence on an observation section structure by a later process.
Figure 5C:
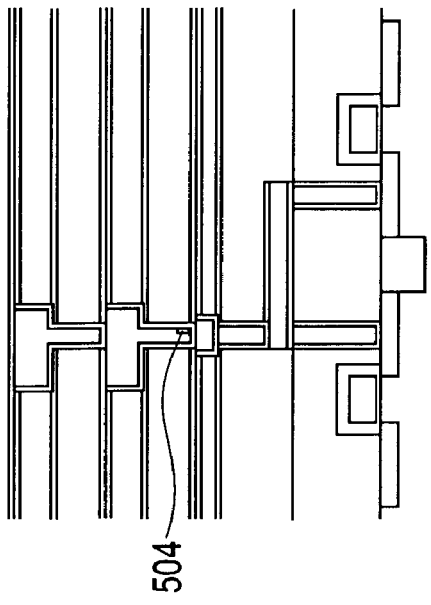
Figure 5B:
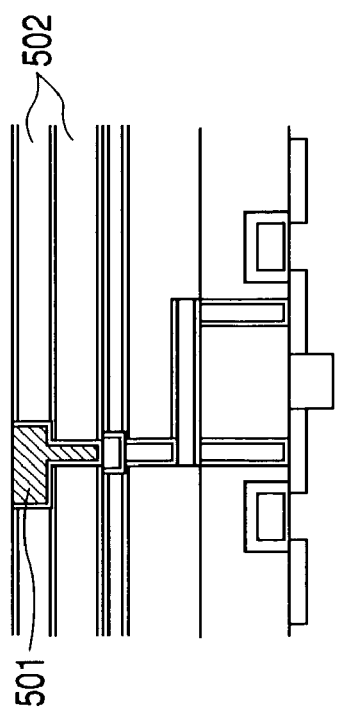
Figure 5D:
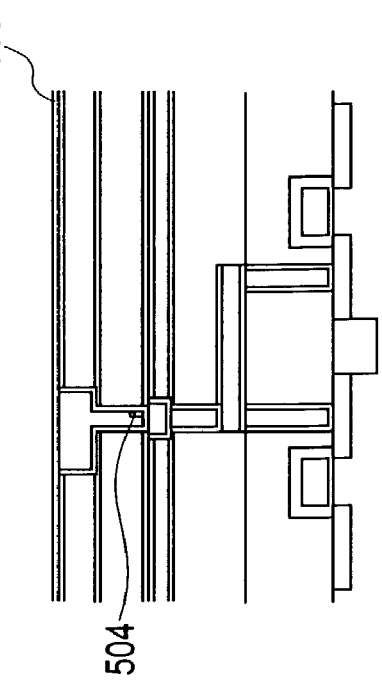

FIG. 1 shows the configuration of an example of a system for failure analysis according to the invention. A system 101 for failure analysis is constructed by: an apparatus 102 for micro-sample extraction capable of directly extracting a micro-sample having a size of about a few microns to tens microns without cutting a wafer; an apparatus 103 for micro-sample storage for storing the extracted micro-sample; an apparatus 104 for filing data of the stored sample for controlling management data of the micro-sample; an apparatus 105 for additional processing the micro-sample, which processes the stored micro-sample into a form for analysis in response to a failure analysis request; and an apparatus 106 for failure analysis for analyzing the processed micro-sample.

The outline of the system for failure analysis will be described hereinbelow. First, a process which is expected to be subjected to failure analysis later is selected from device manufacturing processes.

Figure 6:
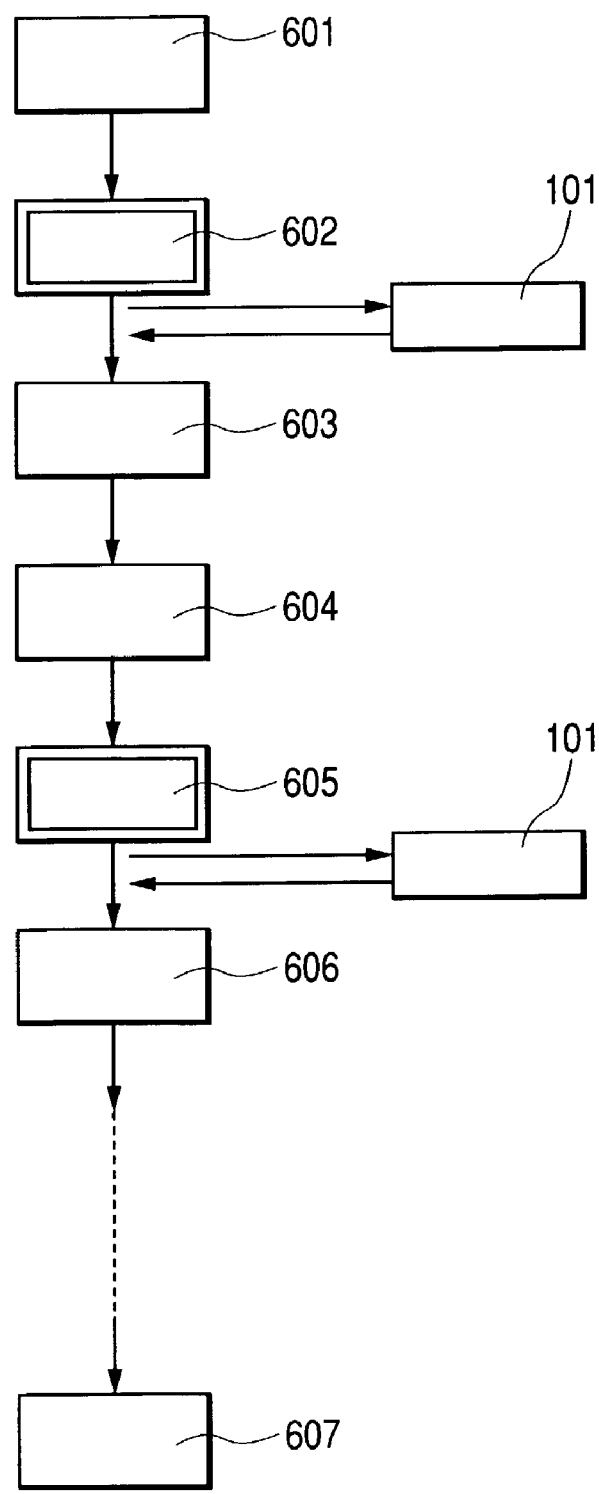
FIG. 6 is a diagram for explaining a process of extracting and selecting a micro-sample in a device process flow.

601 to 607 shown in FIG. 6 indicate processes of device manufacture and correspond to, for example, exposure, dry etching, CVD (Chemical Vapor Deposition), wet etching, CMP (Chemical Mechanical Polish), and the like. For example, if the processes 602 and 605 are selected as processes of extracting a micro-sample from the processes 601 to 607, the processes are preliminarily input as information 119 of an extraction schedule and an extraction position to the apparatus 104 for filing data of the stored sample.

When it is assumed in FIG. 1 that an apparatus for performing the process 602 is an apparatus 107 for processing, according to the information, a wafer 108 processed by the apparatus 107 for processing is introduced into the apparatus 102 for micro-sample extraction in the system 101 for failure analysis. The apparatus 104 for filing data of the stored sample receives process information 114 from the apparatus 107 for processing (or a data base for managing process parameters of the apparatus 107 for processing) and transmits information 115 of a position from which the micro-sample is extracted in the wafer, a position of a micro-sample storage for storing the micro sample, and the like to the apparatus 102 for micro-sample extraction, and the like. On the basis of the extraction position information and the storage position information, the apparatus 102 for micro-sample extraction extracts a micro-sample 110 from the wafer 108 and stores the micro-sample 110 into a designated position in a micro-sample storage 109. The apparatus 103 for micro-sample storage is connected to the apparatus 102 for micro-sample extraction, and the micro-sample storage 109 is stored in the apparatus 103 for micro-sample storage. Information 116 of a storage position in the apparatus 103 for micro-sample storage is sent to the apparatus 104 for filing data of stored sample.

The micro-sample is managed as data by the apparatus 104 for filing data of the stored sample and stored as hardware in the apparatus 103 for micro-sample storage. The wafer 108 from which the micro-sample 110 is extracted is subjected to the following process 603 as shown in FIG. 6. After that, the wafer subjected to the process 605 is introduced into the apparatus 102 for micro-sample extraction in the system 101 for failure analysis and a micro sample is extracted. In such a manner, the micro sample is similarly stored into the apparatus 103 for micro-sample storage in important points in the process.

Examples of information recorded in the apparatus 104 for filing data of the stored sample at the time of micro-sample extraction (at the time point when the micro-sample is housed in the micro-sample storage) are a process flow, process parameters (such as temperature and time), process date and time, wafer lot number, micro-sample extraction process, micro-sample extraction lot, -micro-sample extraction wafer, micro-sample extraction chip, micro-sample extraction bit address, micro-sample extraction direction, micro-sample storage number, and micro-sample storage hole number.

After that, for example, after an inspection process, when a process to be subjected to failure analysis and the details of the failure analysis are determined, a failure analysis requirement 120 is input to the apparatus 104 for filing data of the stored sample. The apparatus 104 for filing data of the stored sample retrieves the storage position of the micro-sample 110 from a data base. The apparatus 103 for micro-sample storage receives the storage position information and introduces the corresponding micro-sample storage 109 to the connected apparatus 105 for additional processing the micro-sample. The apparatus 105 for additional processing the micro-sample receives the information 117 of the storage position of the micro-sample 110 in the micro-sample storage 109 and an additional process position from the apparatus 104 for filing data of the stored sample, extracts the corresponding micro-sample 110, places the extracted micro-sample 110 onto a sample holder, and performs an additional processing such as a thinning process (for example, forming a gate vertical section). A specimen 113 for failure analysis subjected to the additional process as described above is introduced into the apparatus 106 for failure analysis where failure analysis is conducted. Analysis information 118 is transmitted to the apparatus 104 for filing data of the stored-sample and stored. Information obtained by adding the analysis information 118 with process information and the like is output as failure analysis information 121. In such a manner, failure analysis data (including image data) is output in response to the failure analysis request.

By constructing such a system, a micro-sample extracted immediately after an arbitrary process can be stored. Thus, a failure can be directly analyzed in response to a request for analyzing a failure which is found later. Thus, efficient analysis can be realized.

A concrete configuration of the apparatus for micro-sample extraction as a key apparatus among the apparatuses constructing the system for failure analysis of the invention will now be described with reference to FIG. 7.

The apparatus 102 for micro-sample extraction includes: a movable specimen stage 702 on which a specimen substrate such as the semiconductor wafer 108 is placed; a specimen-stage position controller 703 for controlling the position of the specimen stage 702 for specifying the observation/process position of the wafer 108; an ion-beam irradiating optical system 705 for irradiating the wafer 108 with an ion beam 704 to perform a process; an electron-beam irradiating optical system 707 for emitting an electron beam 706 for observing the periphery of the wafer 108; and a secondary-electron detector 708 for detecting secondary electrons from the wafer 108.

The configuration of the ion-beam irradiating optical system 705 is as follows. An acceleration voltage with respect to a ground voltage is applied from a power source 716 for an acceleration voltage to an ion source 715 for generating ions. In the case where ion discharge of the ion source 715 is unstable, Joule's heating is performed from a power source 717 for Joule's heating, thereby improving the state of the ion source 715. An extractor 718 for generating an ion extracting electric field applies an extraction voltage from an extractor power source 719 to the ion source 715. Spread of an ion beam extracted is regulated by an aperture 720. The aperture has the same potential as that of the extractor 718. The ion beam passed through the aperture 720 is condensed by a condenser lens 722 to which a condense voltage is applied from a condenser-lens power source 721. The condensed ion beam is scanned and deflected by a deflector 724 to which a power from a deflector power source 723 is applied. The deflected ion beam is condensed onto the surface of the wafer 108 by an objective lens 726 to which an objective voltage is applied from an objective-lens power source 725. The power source 716 for acceleration voltage, extractor power source 719, condenser-lens power source 721, deflector power source 723, and objective-lens power source 725 are controlled by a controller 727 for ion-beam irradiating optical system.

A probe 728 for extracting a micro-sample in the wafer 108 processed with the ion beam 704 is driven by a probe driver 729 controlled by a probe position controller 730. The position, heater temperature, valve opening/closing, and the like of a deposition-gas supplying source 731 for supplying a deposition gas for forming an ion beam assisted deposition film used for fixing the probe 728 and the micro-sample are controlled by a deposition-gas controller 732. The micro-sample storage 109 having a plurality of holes for storing extracted micro-samples is disposed on a side of the specimen stage 702.

Electron beam irradiation conditions, position, and the like of the electron-beam irradiating optical system 707 are controlled by a controller 733 for electron-beam irradiating optical system. The controller 727 for ion-beam irradiating optical system, specimen-stage position controller 703, probe position controller 730, a monitor 734 for displaying detection information of the secondary-electron detector 708, and the like are controlled by a central processing unit 735. The specimen stage 702, micro-sample storage 109, ion-beam irradiating optical system 705, electron-beam irradiating optical system 707, secondary-electron detector 708, probe 728, and the like are disposed in a vacuum chamber 737. The central processing unit 735 transmits/receives micro-sample extraction position information and storage position information to/from the apparatus 104 for filing data of stored-sample.

A concrete method of storing a micro-sample into the micro-sample storage 109 will be described with reference to FIGS. 8(a) to 8(i) from a state where the wafer 108 is introduced into the apparatus 102 for micro-sample extraction shown in FIG. 7 after completion of a device process.

First, rectangular holes 801 and 802 are formed with the ion beam 704 on both outer sides of a portion from which a micro-sample is to be extracted in the wafer 108 (FIG. 8 (a)). After that, a rectangular trench 806 is formed with the ion beam 704 (FIG. 8(b)). The specimen stage 702 is tilted so that the specimen surface is irradiated obliquely with the ion beam 704 to form an inclined trench 808, thereby forming the micro-specimen 110 connected with the wafer 108 only via a residual area 805 (FIG. 8(c)). The tilted specimen stage is set to the original state, and the probe driver 729 is controlled by the probe position controller 730 so that the probe 728 comes into contact with a part of the micro-sample 110. The probe 728 and the micro-sample 110 which are in contact with each other are fixed by using ion beam assisted deposition (FIG. 8(d)). After an ion beam assisted deposition film 809 is formed, the residual area 805 is cut with the ion beam 704 (FIG. 8(e)).

The micro-sample 110 is cut out in such a manner and extracted by lifting the probe 728 by the probe driver 729 (FIG. 8)f)). After that, the micro-sample 110 which is cut out is inserted into a storage hole 811 in the micro-sample storage 109 (FIG. 8 (g)). After the insertion, the tip of the probe 728 is cut with the ion beam 704 to separate the micro-sample 110 (FIG. 8(h)). In such a manner, the micro-sample 110 is stored into the micro-sample storage 109 (FIG. 8(i)). In the case of extracting micro-samples in a plurality of positions after that, the process is repeated, the micro-sample 110 is stored into another storage hole 812.

Figure 7:
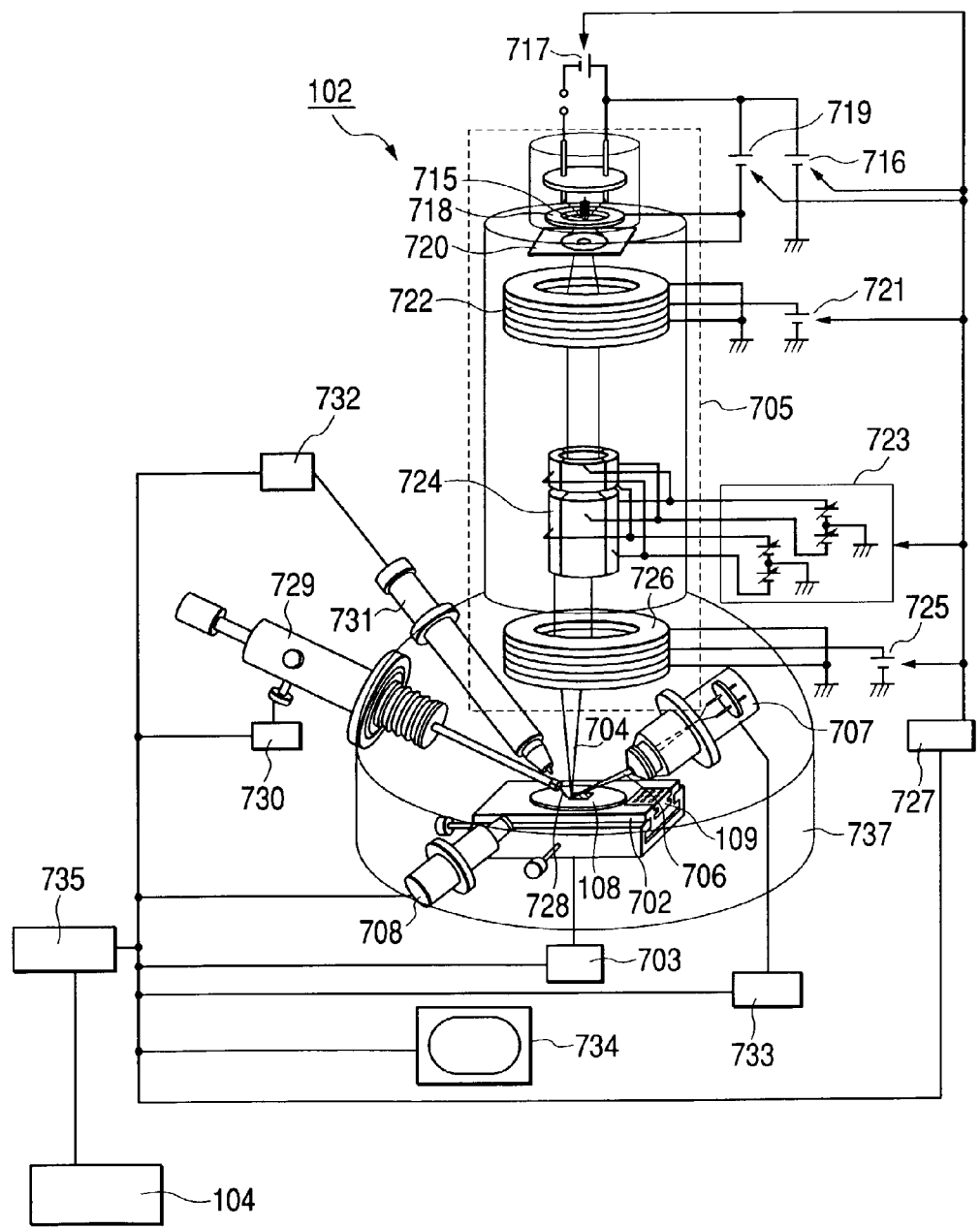
FIG. 7 is a diagram for explaining an example of the configuration of an apparatus for micro-sample extraction.
Figure 8A:
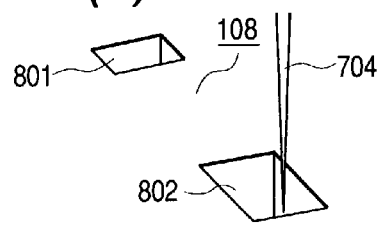
FIGS. 8(a) to 8(i) are diagrams for explaining an example of a micro-sample extraction flow.
Figure 8F:
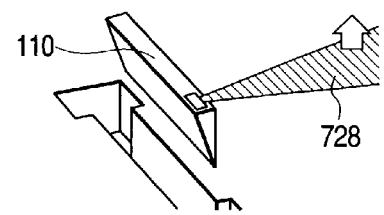
Figure 8B:
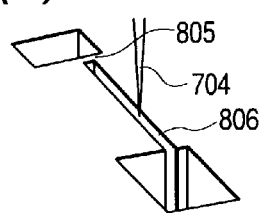
Figure 8G:
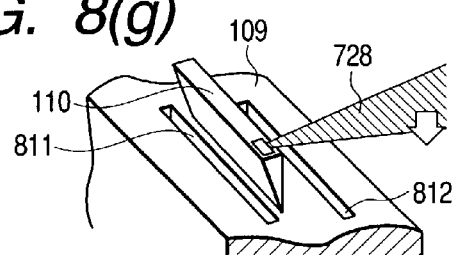
Figure 8C:
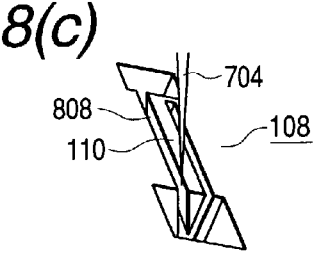
Figure 8H:
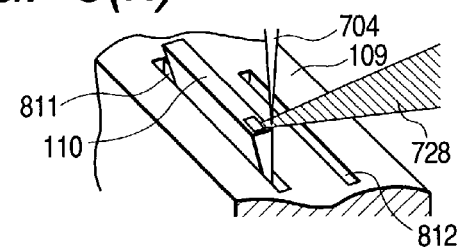
Figure 8D:
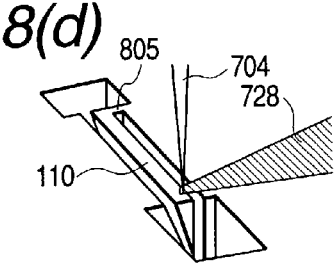
Figure 8I:
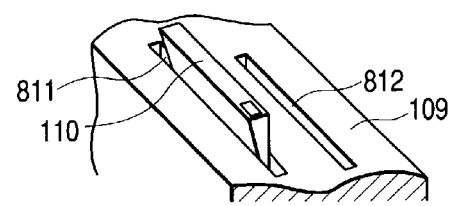
Figure 8E:
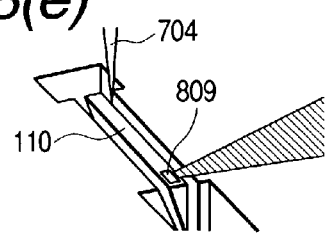

The micro-sample extraction has been described with respect to the case of using the apparatus for micro-sample extraction as shown in FIG. 7 in which the specimen stage 702 is tilted. However, in an apparatus configuration in which a specimen stage 1501 is not tilted but an ion-beam irradiating optical system 1502 is disposed so as to be tilted with respect to the specimen surface as shown in FIG. 15, by rotation control using the normal line to the specimen surface of the specimen stage 1501 as a rotation axis, a micro-sample extracting process as described above can be realized.

Figure 15:
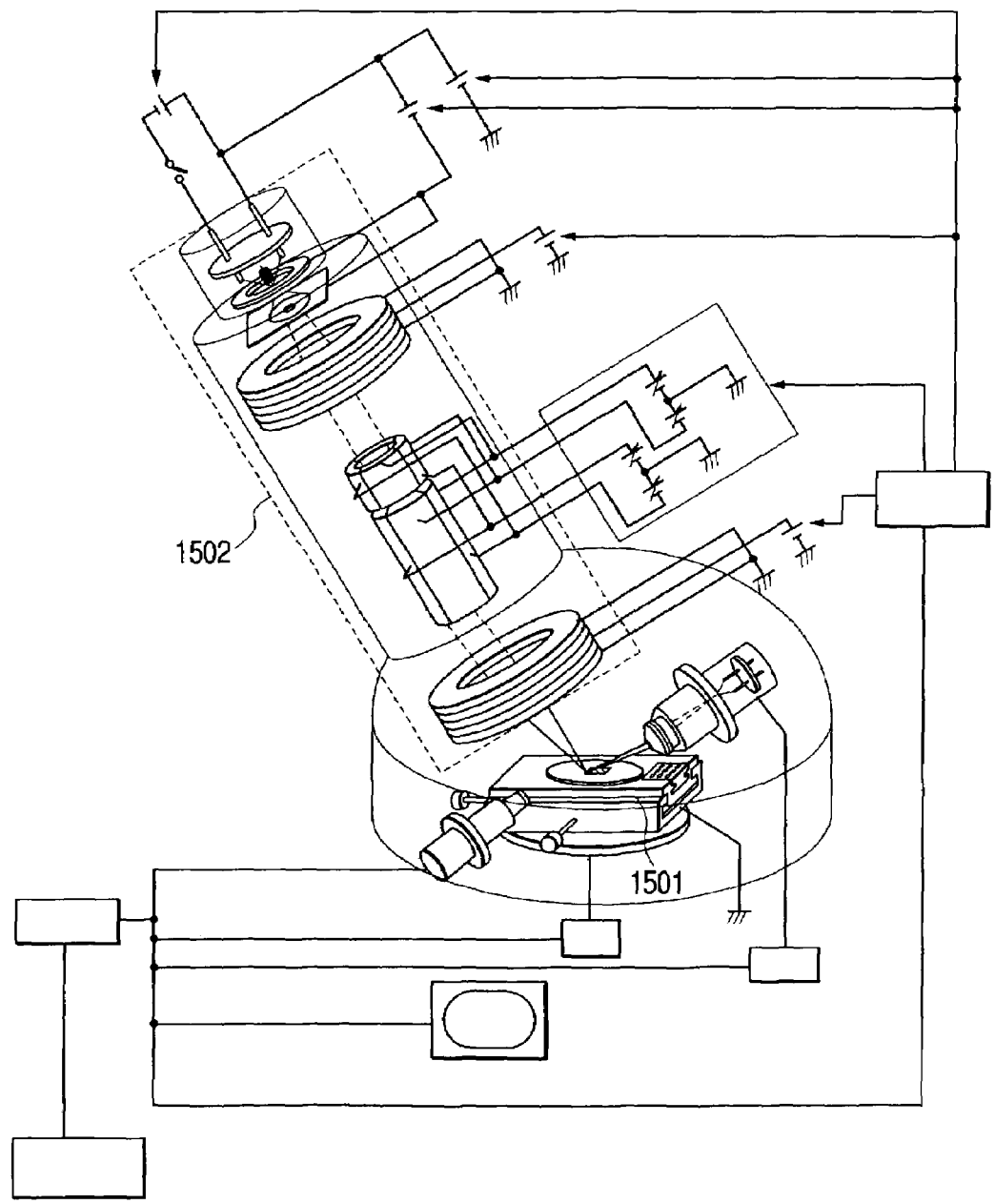
FIG. 15 is a diagram for explaining the configuration of an apparatus for micro-sample extraction by a tilted ion beam optical system.

The mechanism of FIG. 15 is similar to that of FIG. 1 except for the above-described tilt configuration. In FIG. 15, for simplicity of the diagram, a probe related mechanism and a deposition gas source related mechanism are not shown but exist in reality.

Figure 9A:
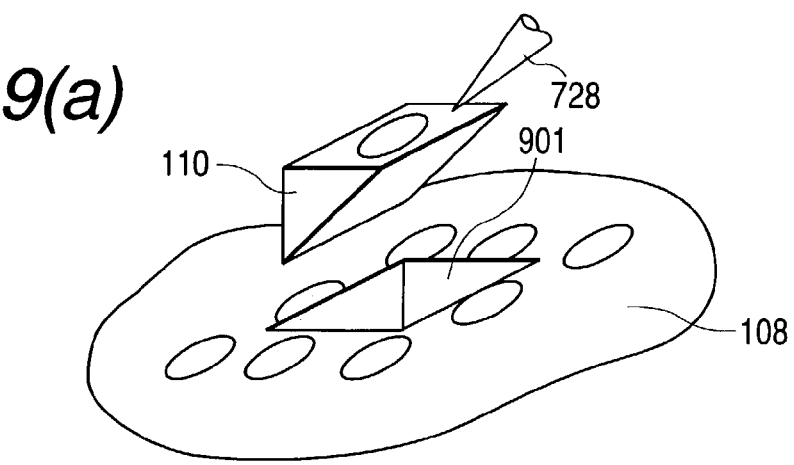
FIGS. 9(a) to 9(c) are diagrams for explaining an example of a method of filling a processed hole.
Figure 9B:
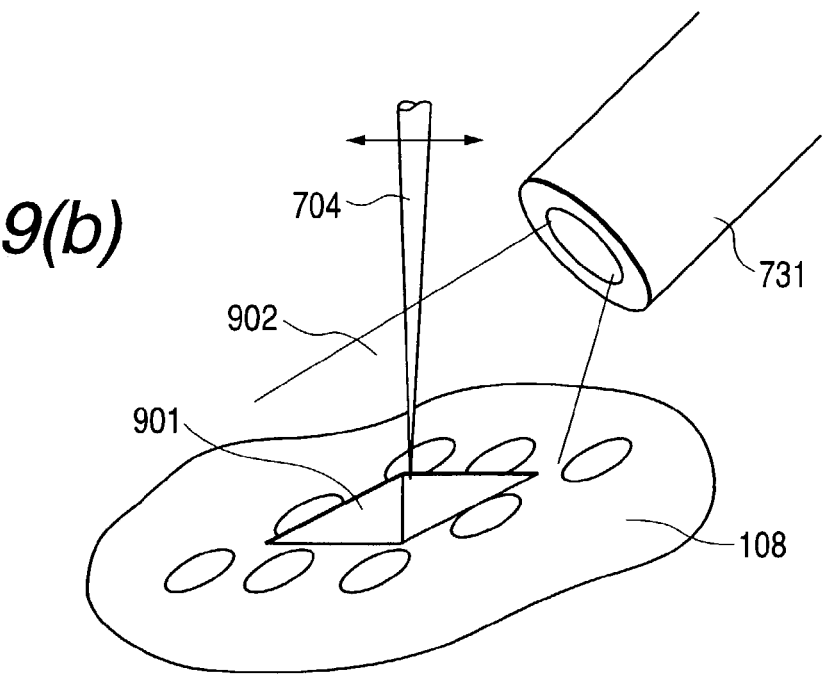
Figure 9C:
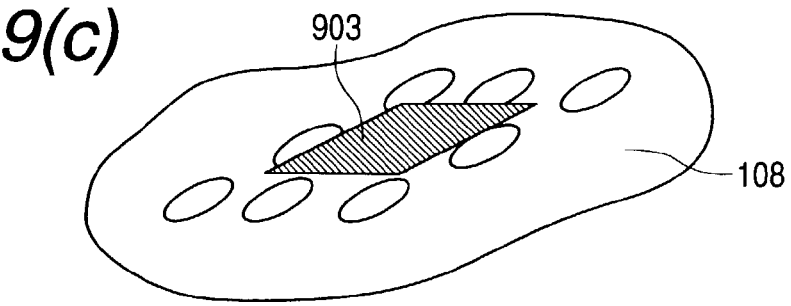

The wafer 108 is taken out from the apparatus 102 for micro-sample extraction and is subjected to the next device process (process 603 in the case of FIG. 6). In the wafer 108, a processed hole for micro-sample is open. Consequently, there is the possibility that the processed hole causes a failure in any of the subsequent processes. It is therefore desired to fill the processed hole. FIGS. 9(a) to 9(c) show an example of a filling method.

FIG. 9(a) shows a state where the micro-sample 110 is extracted from the wafer 108 by the probe 728 and a processed hole 901 is open. By scanning the processed hole 901 with the ion beam 704 while supplying a deposition-gas 902 (such as phenanthrene, tungsten hexacarbonyl, or tetraethoxysilane) from the deposition-gas supplying source 731, the hole can be filled with a deposition material 903 as shown in FIG. 9(c). By making the wafer 108 in which the hole is filled subject to the next process, a process failure caused by the processed hole can be suppressed.

Figure 10:
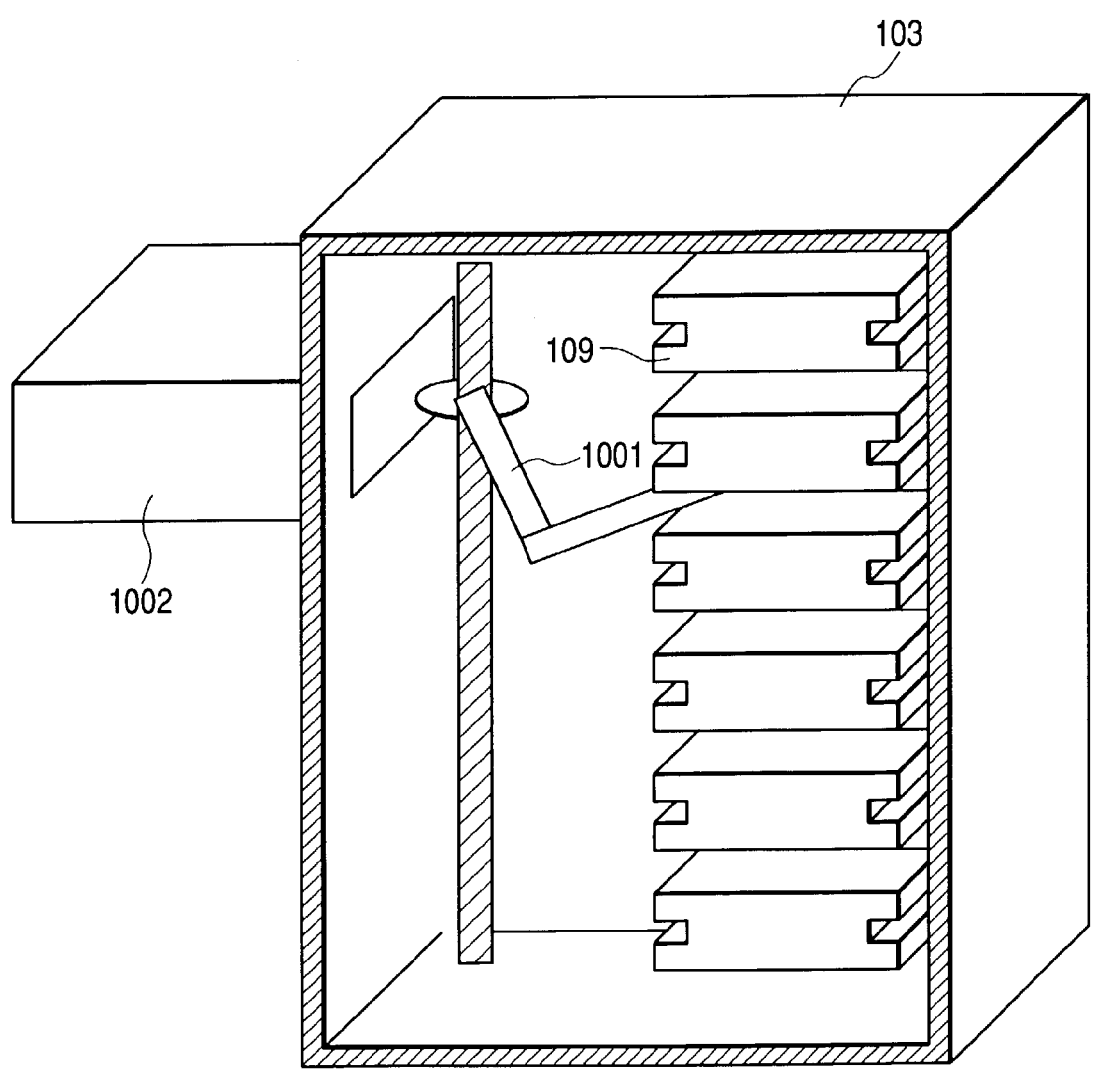
FIG. 10 is a diagram for explaining another example of the configuration of an apparatus for micro-sample storage.

On the other hand, the micro-sample storage 109 for storing the extracted micro-sample 110 is stored in the apparatus 103 for micro-sample storage capable of storing a plurality of micro-sample storages. The apparatus 103 for micro-sample storage has a configuration, for example, as shown in FIG. 10, including a load/unload system 1001 capable of loading/unloading an arbitrary micro-sample storage 109 and can be connected to the apparatus 102 for micro-sample extraction or the apparatus 105 for additional processing micro-sample via a connecting apparatus section 1002. The micro-sample storage 109 can be loaded or unloaded without being exposed to the atmosphere.

An area to be observed and analyzed in a test or the like in a post process on the wafer 108, in the micro-sample stored as described above is determined. For example, in a probe test, failure information of short-circuit, breaking of wire, writing, reading, and the like is obtained. On the basis of the failure information, a process, an area, a direction, and the like to be actually observed are determined. For example, in the case where breaking of metal wires often occurs, observation of sections of a few processes after a metal line forming process is determined. In the case where, for example, a plug, a contact, or the like has high resistance, a section of a residual film of an etched hole for a plug, a section of a plug, a plan view of the connecting portion, or the like is determined.

Based on the information determined as described above, corresponding wafer lot, wafer, process, and chip are determined, the micro-sample storage 109 is introduced into the apparatus 105 for additional processing micro-sample, and a micro-sample (in this case, the micro-sample 110) is extracted from a corresponding storage hole. The extraction will be described by referring to FIGS. 11(a) to 11(e).

As shown in FIG. 11(a), the micro-sample 110 is extracted by using a probe 1105. Although it is drawn that the storage hole 811 and the like are open to this side, the holes are individual holes which are not open to the side face in reality. The micro-sample 110 may be extracted by the above-described method using the ion beam assisted deposition film or a method using tweezers which will be described later.

In the case where the area to be observed and analyzed (hereinbelow, described as "area to be observed" in order to simplify the description) determined from the test result is, for example, a section perpendicular to the specimen surface of the original wafer 108, the micro-sample 110 is fixed in a posture such that the observation section is parallel to the longish direction 1103 of a surface 1102 for fixing the micro-sample of a micro-sample holder 1101 for introducing the micro-sample into an observation apparatus and is perpendicular to the surface 1102 for fixing the micro-sample. The fixing is carried out by, for example, an ion beam assisted deposition film 1104 or the like. After that, the probe 1105 is removed (for example, in the case where the ion beam assisted deposition is used for fixing the probe 1105, the tip of the probe 1105 is cut with the ion beam 1106) and a cross section of the target area is obtained or the target area is thinned to a thickness of about 100 nm, thereby enabling a section to be observed in a desired position by an SEM or TEM as shown in FIG. 11(c).

In the case where the observation area determined from the result of the test is a surface parallel to the specimen surface of the original wafer 108, the micro-sample is fixed in a posture such that the observation surface is parallel to the longish direction 1103 of the surface 1102 for fixing the micro-sample of the micro-sample holder 1101 and is perpendicular to the surface 1102 for fixing the micro-sample as shown in FIG. 11(d). The fixing as shown in FIG. 11(d) can be realized when the probe 1105 has a rotating mechanism and the posture of the micro-sample 110 can be turned by 900 from the posture at the time of extraction. If the probe 1105 does not have the rotating mechanism, as shown in FIG. 11(d), the micro-sample holder 1101 is tilted by 900 in advance and the micro-sample 110 is fixed to the tilted micro-sample holder 1101. After that, the probe 1105 is removed in a manner similar to the case of the perpendicular cross section and, in the case of FIG. 11(d), the posture is returned by 900. By forming a section of the target plane position or thinning the target plane area, as shown in FIG. 11(e), the plane in the desired position can be observed.

Although the case where the apparatus 102 for micro-sample extraction and the apparatus 105 for additional processing micro-sample are separate apparatuses has been described, a single apparatus can be used for extracting the micro-sample and performing an additional process.

The size of the micro-sample 110 to be extracted will now be described. An object of the invention is to provide an arbitrary observation surface which is determined after a device inspection, so that it is necessary to assure a minimum repetition pattern of the device. Although a repetition pattern of a large cycle exists naturally, an object is a repetition pattern of a size of about 100 μm or less which does not exert an influence on the process and can be processed in realistic time with an ion beam.

Figure 12A:
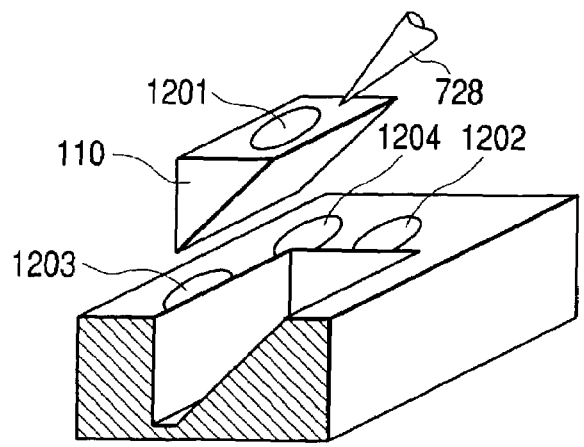
FIGS. 12(a) to 12(d) are diagrams for explaining an example of a size necessary for a micro-sample with respect to a device repetition pattern.

For example, if device patterns 1201, 1202, 1203, and 1204 as shown in FIG. 12(a) are repetition patterns, the micro-sample 110 of a size including at least one (1201) of the patterns is extracted. The repetition patterns include one pattern with respect to naturally the specimen surface and also with respect to the inside of the specimen (depth direction).

In FIG. 12(a), the case of a simple configuration in which one pattern of a DRAM or the like has one transistor and one capacitor is shown. For example, in the case of an SRAM (Static Random Access Memory), in some cases, six transistors exist in one pattern. In such a case, the size including all of the six transistors has to be extracted.

Figure 12B:
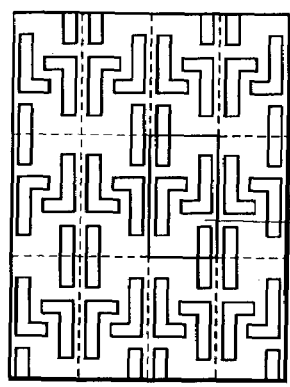
Figure 12C:
Figure 12D:
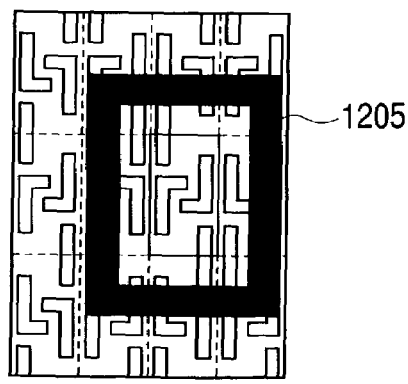

FIG. 12(b) shows an example of the surface after a wiring process of an SRAM. A repetition pattern corresponding to storage of one bit is as shown in FIG. 12(c) (in FIG. 12(b), the boundary is indicated by broken lines). Consequently, in an ion beam process for extracting the pattern, an area indicated by 1205 in FIG. 12(d) has to be extracted. By assuring the size of the micro-sample to be extracted as described above, an arbitrary position in a pattern can be additionally processed.

Figure 13A:
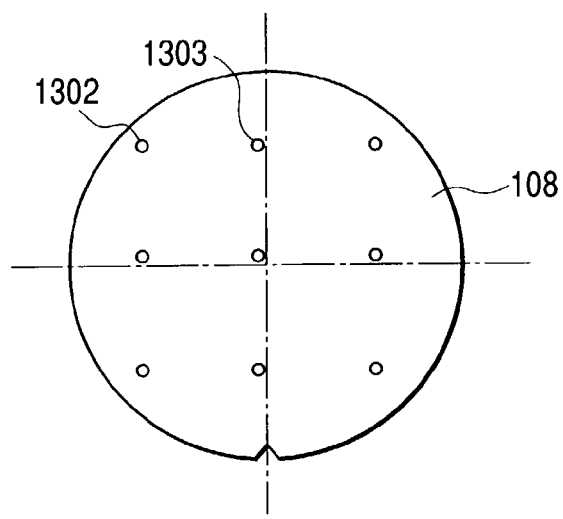
FIGS. 13(a) to 13(d) are diagrams for explaining an example of the extraction position of a micro-sample in a wafer.

Coordinates at the time of extracting a micro-sample in the wafer 108 will now be described. The object to be analyzed by the system is a failure caused by a problem of a process itself rather than a failure existing in a specific point. Since failures of a process itself often vary according to positions such as the center of the wafer and a periphery, it is desirable to store nine points such as 1302 and 1303 shown in FIG. 13(a) in the surface of the wafer 108 per process.

Figure 13B:
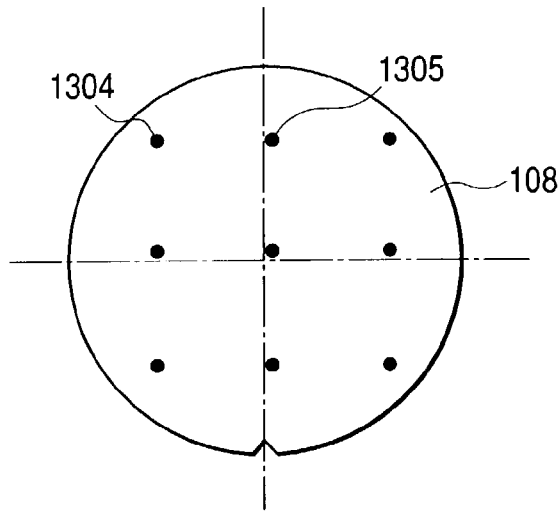
Figure 13C:
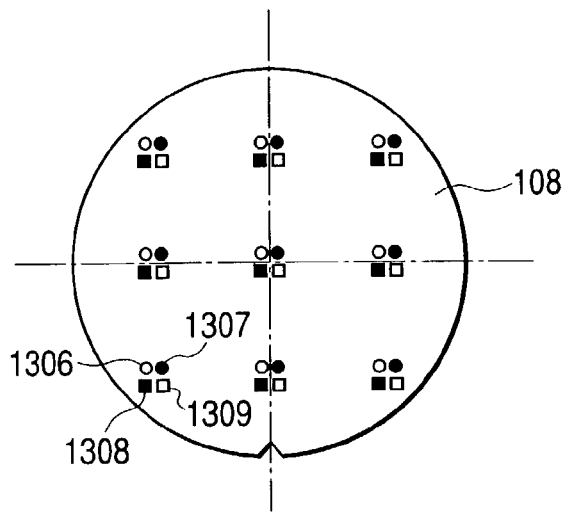
Figure 13D:
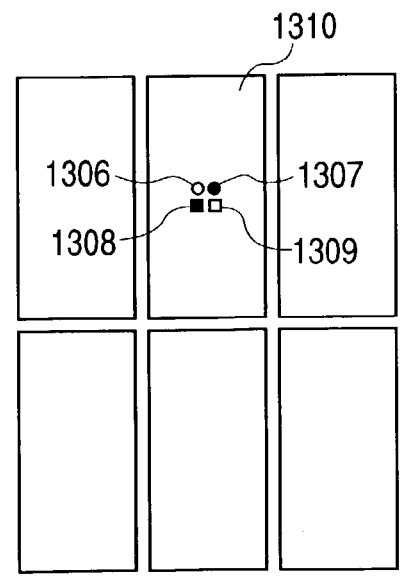

Consequently, in the following micro-sample extracting process as well, micro-samples are similarly extracted from nine points. However, the positions of points 1304, 1305, . . . shown in FIG. 13(b) different from the extraction positions (1302, 1303, . . . ) of last time are selected. Micro-samples are similarly extracted while changing the extraction positions. FIG. 13(c) shows, for example, points (1306, 1307, 1308, 1309, . . . ) to be analyzed after four kinds of processes. Although the position to be analyzed is largely drawn as compared with the wafer size for easier understanding, the areas to be analyzed in reality are sufficiently small. Consequently, as shown in FIG. 13(d) for example, all of points to be analyzed are within one chip 1310. The number of chips sacrificed for failure analysis is sufficiently small, so that it is efficient. However, since a failure may occur due to the influence of deterioration of the area of the extracting process near the extracted portion (including the process of filling the processed hole), it is necessary to set analysis points of processes so as not to be too close to each other.

Once a micro-sample is extracted from a wafer, it becomes difficult to make the coordinates in the wafer and those of the micro-sample coincide with each other. In order to make the coordinates coincide with each other, marking as described below is effective.

Figure 14A:
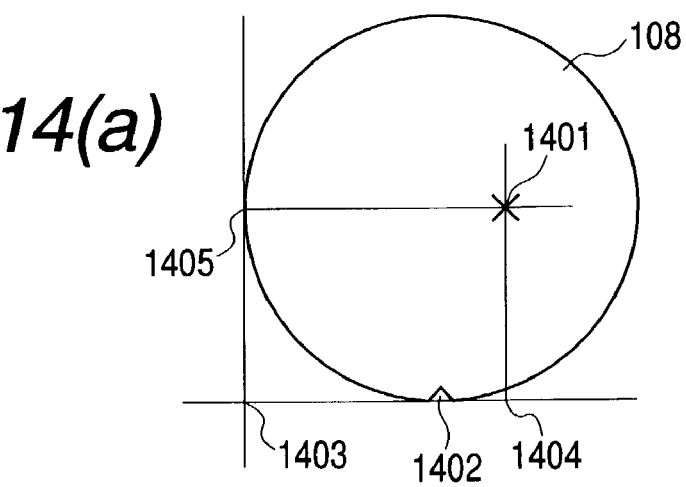
FIGS. 14(a) to 14(d) are diagrams for explaining an example of marking for coordinate identification.
Figure 14B:
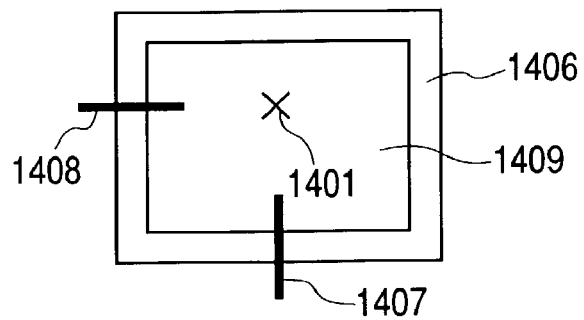

In a coordinate system in the wafer 108, as shown in FIG. 14(a), a notch 1402 is positioned at the bottom and an intersecting point of peripheral tangents is set as the origin 1403. The coordinates of an analysis point 1401 are expressed by an abscissa 1404 and an ordinate 1405. Although the analysis point 1401 is indicated by X in the diagram, such a mark does not exist in reality. In order to identify the analysis point 1401, as shown in FIG. 14(b), marks 1407 and 1408 are formed by an ion beam process.

Figure 14C:
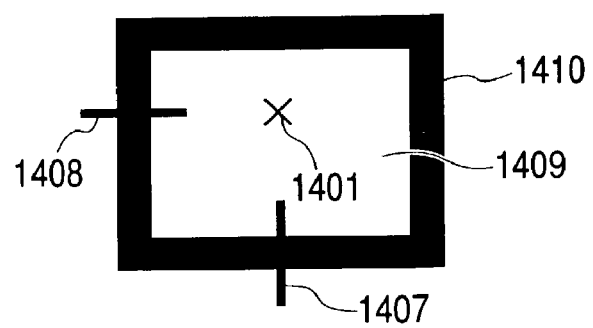
Figure 14D:
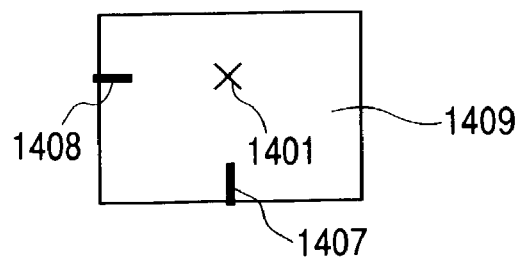

A rectangular frame on the inside indicates an area 1409 of a micro-sample to be extracted, and an area surrounded by two quadrangles is an area 1406 to be processed with an ion beam. Consequently, the marks 1407 and 1408 are formed so as to extend at least into the area 1409. From the viewpoint of forming the mark of the extraction position also in the wafer 108, it is desirable to form the marks 1407 and 1408 so as to extend to the outside of the area 1406 for processing. FIG. 14(c) shows a state after the ion beam processing for extraction. Even after an ion-beam processed area 1410 is cut and the micro-sample is extracted as shown in FIG. 14(d), the analysis point 1401 can be identified from the positions of the marks 1408 and 1407.

As described above, a sample at the time of a process finished before can be assured by the failure analysis system for extracting and storing a micro-sample every arbitrary process of the invention. Thus, an observation image of the target position which is not influenced by subsequent processes can be obtained, and a-failure analysis system capable of efficiently finding out the cause of a failure can be realized.

An example of the shape of the sample storage in the invention will now be described by referring to FIGS. 16 (a) to 16(c).

Figure 16A:
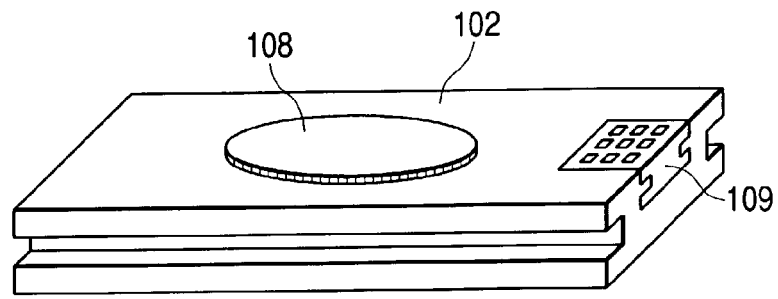
FIGS. 16(a) to 16(c) are diagrams for explaining an example of the shape of a micro-sample storage.
Figure 16B:
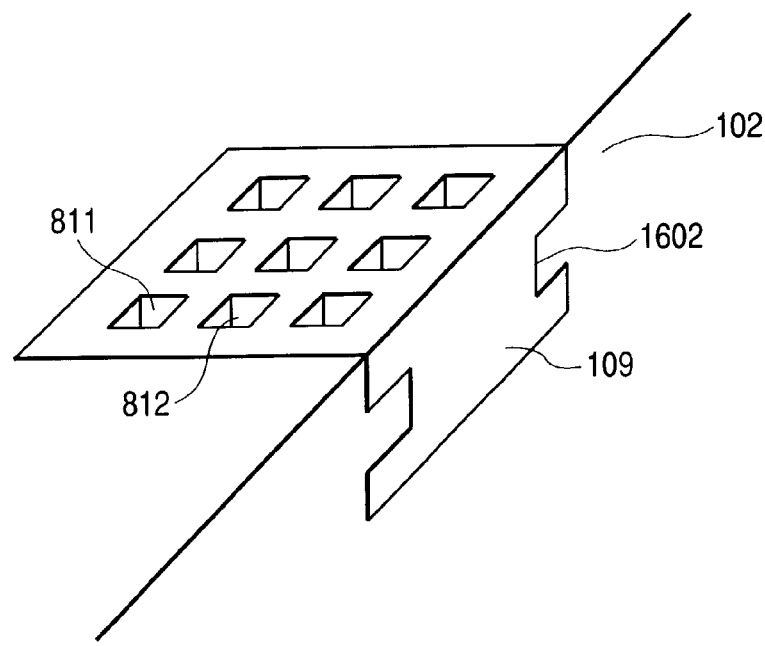
Figure 16C:
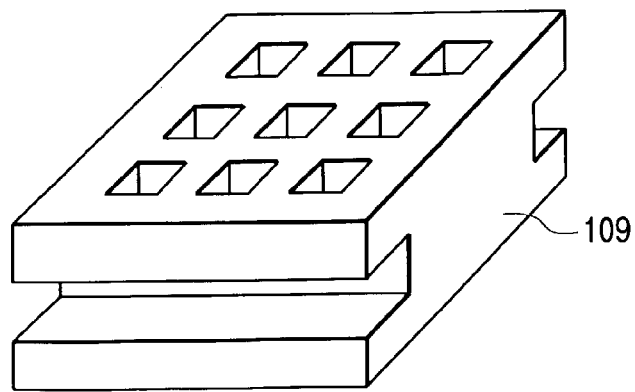

FIG. 16(a) shows an example of the micro-sample storage 109 slidably attached/detached to/from the specimen stage 102 on which the wafer 108 is placed. FIG. 16(b) is an enlarged diagram of the micro-sample storage 109 having a plurality of storage holes 811, 812, . . . Although the storage hole 811 is shown very large for easier understanding of the drawing, in practice, the size of the storage hole 811 is about tens μm in relation to the size of the micro-sample holder 109 ranging from a few mm to a few cm. The micro-sample storage 109 is attached to the specimen stage 102 so as to be slid along a trench 1602. The shape of only the micro-sample storage is shown in FIG. 16(c). The micro-sample storage can be detached simultaneously with or subsequent to extraction of the wafer 108. For the following another wafer, a new micro-sample storage is introduced.

Further, the shape of the storage hole is, ideally, the shape adapted to a wedge shape of the extracted micro-sample shown as the storage hole 811 in FIG. 11. However, the possibility that such a shape can be obtained by a process with an ion beam, a laser beam, or the like is high, so that such a shape is not efficient when a large volume of holes are opened. Consequently, a shape which can be formed by using photolithography, etching, and the like is desirable.

Figure 17A:
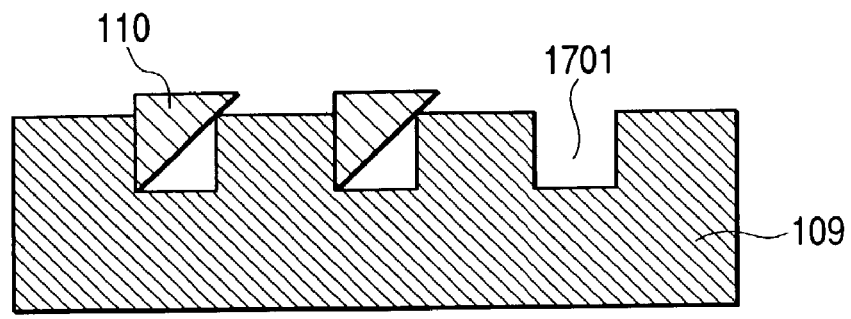
FIGS. 17(a) to 17(c) are diagrams for explaining an example of the shape of a storage hole of the micro-sample storage.
Figure 17B:
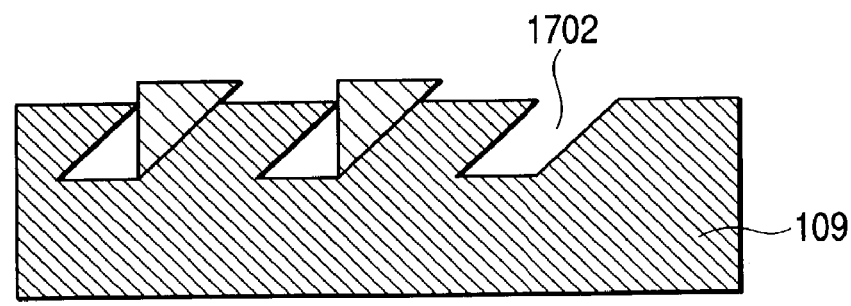
Figure 17C:
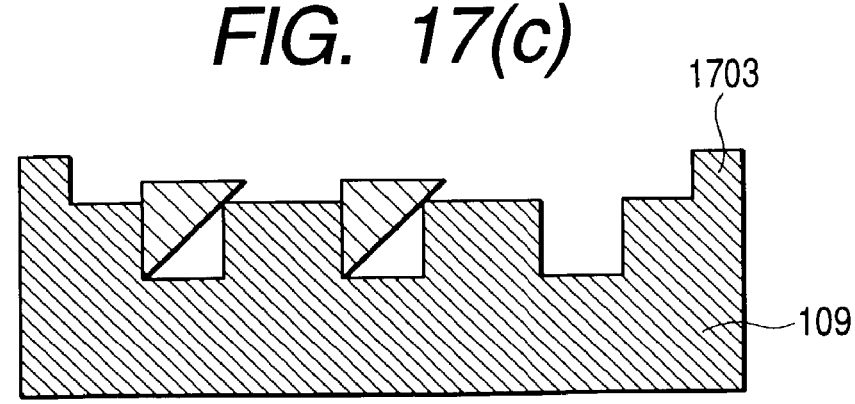

FIG. 17(a) to 17(c) show examples of the sectional shape of the storage hole. FIG. 17(a) shows an example of a storage hole 1701 having a rectangular shape. In this case, considering that the micro-sample 110 is taken again, the storage hole 1701 is formed so that its depth is slightly smaller than that of the micro-sample 110. With the configuration, the posture of the micro-sample 110 can be kept. FIG. 17(b) shows a storage hole 1702 having a parallelogram shape in which, not the face perpendicular to the micro-sample, but a tilted face of a larger area is used as a contact face, thereby enabling stabler storage. In this case as well, the depth of the storage hole 1702 is set to be smaller than that of the micro-sample 110, thereby enabling the posture of the micro-sample 110 to be maintained. The top face of the micro-sample 110 is projected from the surface of the micro-sample storage 109. If it is dangerous, it is desirable that a guard 1703 exists so as to protect the projected portion of the micro-sample 110 as shown in FIG. 17(c). In such a manner, a safe micro-sample storage can be easily formed.

As a material of the micro-sample storage, a material which does not contaminate the micro-sample is desirable. For example, when the sample substrate is a silicon wafer, by making the micro-sample storage of silicon as well, contamination can be suppressed. Since silicon is also adapted to micro-fabrication by photolithography and etching, it is optimum to form the storage hole as well.

Figure 18:
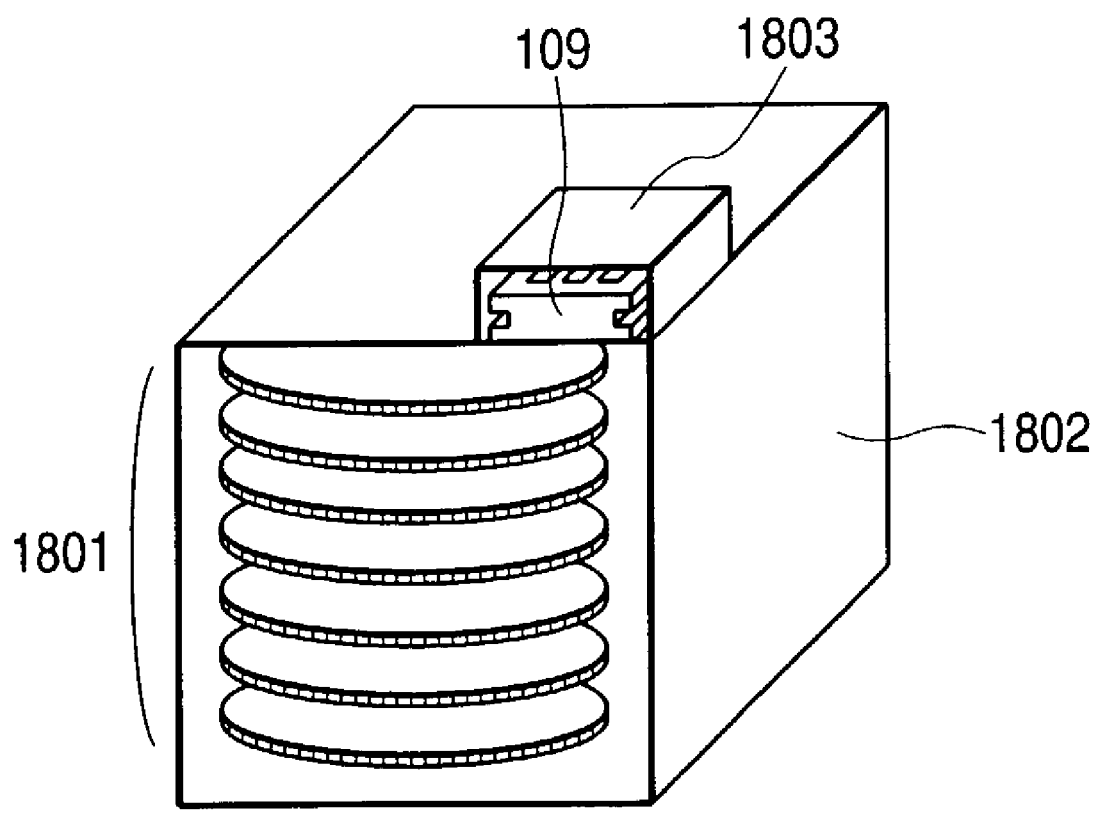
FIG. 18 is a diagram for explaining an example of managing a micro-sample storage together with a wafer cassette.

Since it is efficient to manage a wafer (or a lot) by the same micro-sample storage, preferably, the micro-sample storage 109 (micro-sample 110) is managed together with the original wafer which is moved among the process apparatuses. A form of managing the micro-sample storage 109 together with a wafer case (cassette) will be described by referring to FIG. 18.

A wafer cassette 1802 is used to store and move wafers 1801 to be processed in the same lot. On a side face of the wafer cassette 1802, a storage set space 1803 in which the micro-sample storage 109 can be mounted is provided. With such a configuration, a wafer process and a micro-sample can be easily associated with each other.

As another method of managing the micro-sample 110 (micro-sample storage) together with the original wafer, a wafer-shaped sample storage shown in FIGS. 19(a) to 19(c) will be described.

Figure 19A:
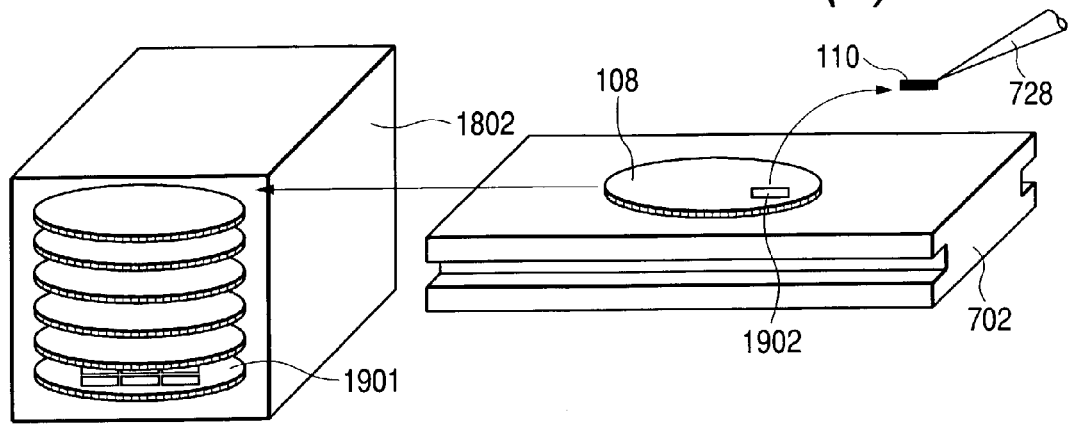
FIGS. 19(a) to 19(c) are diagrams for explaining an example of a wafer-shaped micro-sample storage.
Figure 19B:
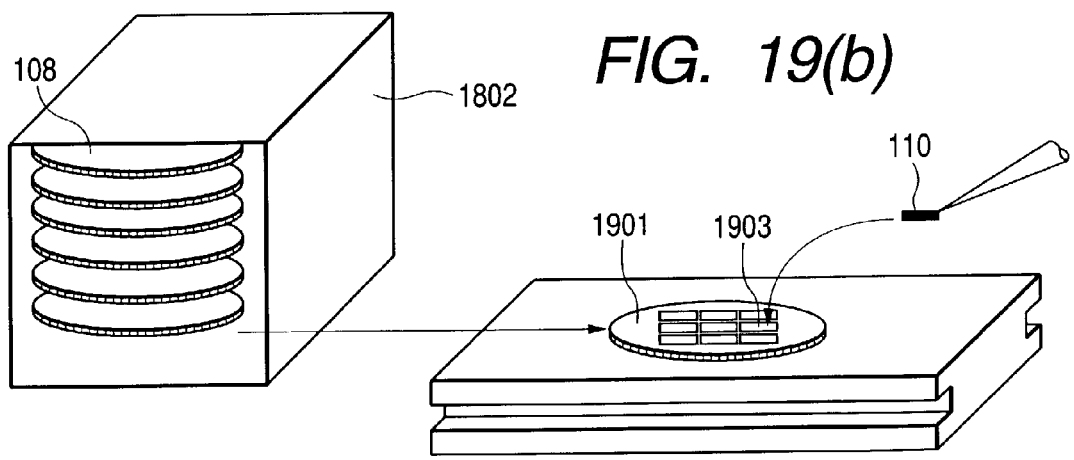
Figure 19C:
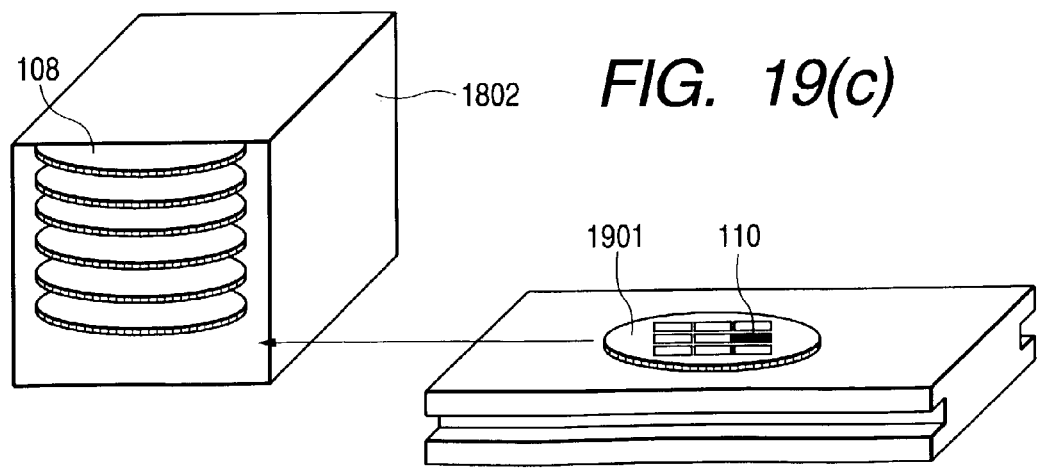
Figure 20:
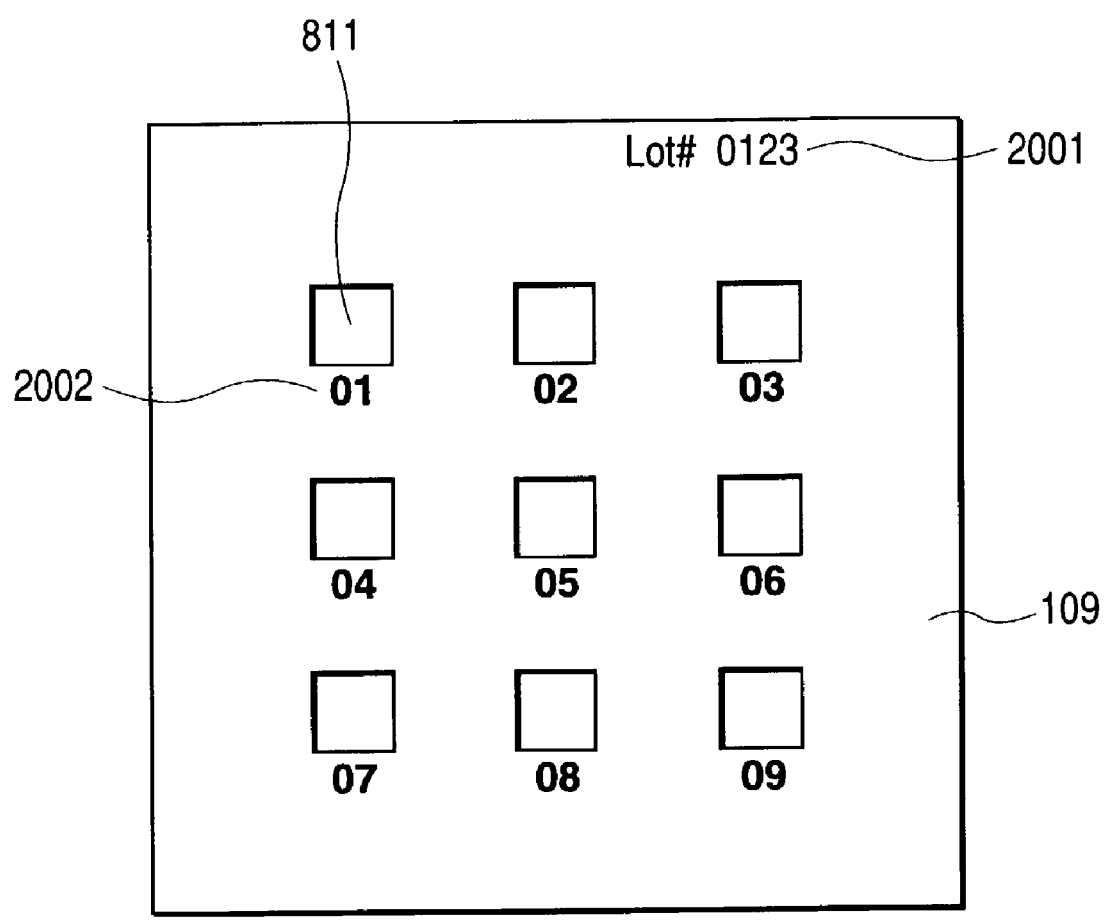
FIG. 20 is a diagram for explaining an example of marking management numbers of the micro-sample storages.

FIG. 19(a) shows a state where the micro-sample 110 is extracted from the wafer 108 by the probe 728. In the wafer 108, a processed hole 1902 from which the micro-sample is extracted exists. The wafer 108 is returned to the wafer cassette 1802 in which one of wafers is not actually a wafer but a micro-sample storage 1901 having the same shape as the wafer. After the wafer 108 is returned, the micro-sample storage 1901 is introduced onto the specimen stage 702.

In the micro-sample storage 1901, storage holes 1903 of micro-samples and the like are formed. Although the storage holes 1903 each having a size larger than the actual size are drawn like the case of FIG. 16, in reality, the size is tens μm in relation to the wafer size of, for example, 200 mm or 300 mm. As shown in FIG. 19(b), the micro-sample 110 is stored into the storage hole 1903. After that, the micro-sample storage 1901 is returned to a predetermined position in the wafer cassette 1802 as shown in FIG. 19(c). As a matter of course, in the case of setting the wafers 108 into the apparatus for processing, the micro-sample storage 1901 is controlled so as not to be erroneously introduced into the apparatus for processing.

In the case of extracting a micro-sample from a few places after a process from a single wafer, the wafer-shaped micro-sample storage is disadvantageous from the viewpoint of time since a wafer is loaded and unloaded for each extraction. However, in the case of extracting a micro-sample from only one position, it is effective with respect to the point that the wafer-shaped micro-sample storage can be easily managed together with wafers.

As described above, productivity of the micro-sample storage is improved by selecting the shape of a hole. By employing the form that the micro-sample storage can be carried together with the wafer, management is facilitated.

The process in the system for failure analysis according to the invention and a method of managing the micro-sample data will now be described.

As described also in the foregoing embodiment, the micro-sample storages 109 are numbered in order to identify micro-samples. For example, the surface of the micro-sample storage 109 may be marked with a corresponding wafer lot number 2001 such as "Lot#0123" or another unique number. If each storage hole, for example, the storage hole 811 is marked with "01" or the like as a micro-sample storage hole number 2002, management is easy.

Figure 21A:
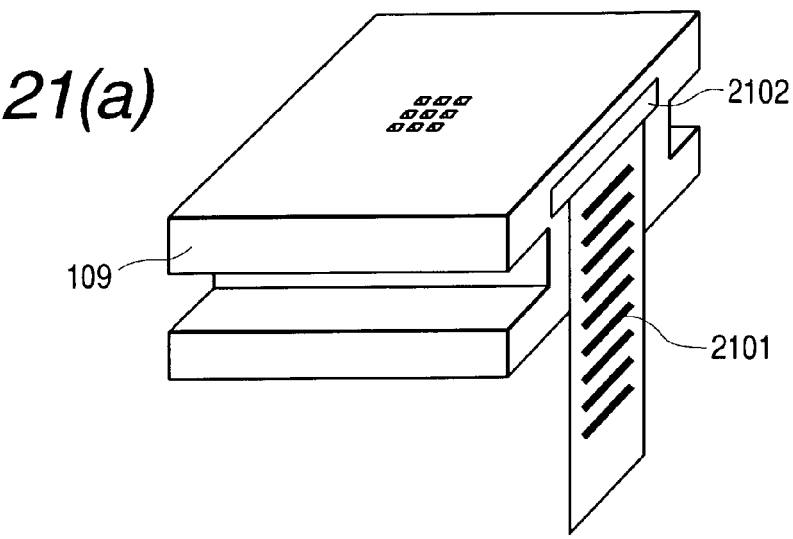
FIGS. 21(a) to 21(c) are diagrams for explaining an example of information management of the micro-sample storage by a process tag.
Figure 21B:
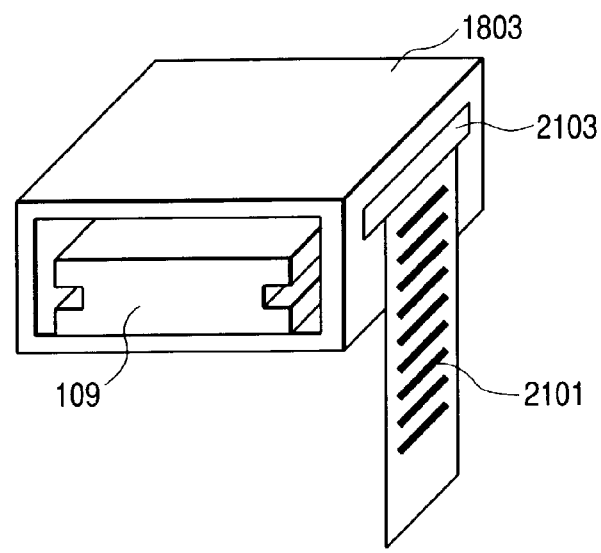
Figure 21C:
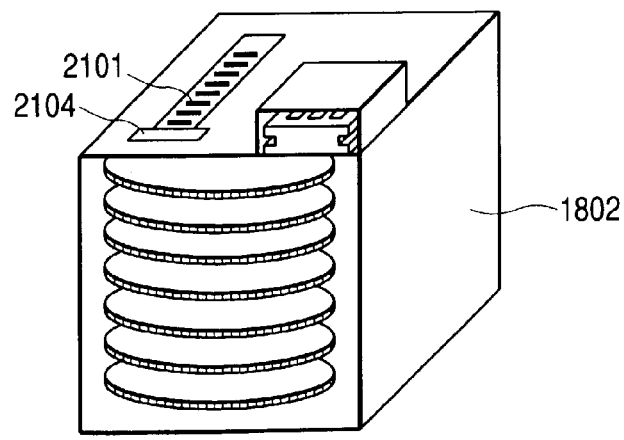

Another data management method of the micro-sample holder 109 is as shown in FIGS. 21(a) to 21(c). FIG. 21(a) shows a form of employing a process tag holder 2102 for attaching a process tag 2101 describing process information, the place where a micro-sample is to be extracted, and the like to the micro-sample holder 109 itself. By the form, a process operator can know at a glance a process after which a micro-sample is to be extracted.

In the form where a process tag holder 2103 is attached not directly to the micro-sample holder 109 but to the storage set space 1803 as shown in FIG. 21(b), the area is not directly in the vacuum so that it is safe from the viewpoint of contamination. In the case where the micro-sample storage can be managed together with the wafer cassette, as shown in FIG. 21(c), the process tag 2101 may be fixed to the wafer-cassette 1802 by a process tag holder 2104.

Figure 22A:
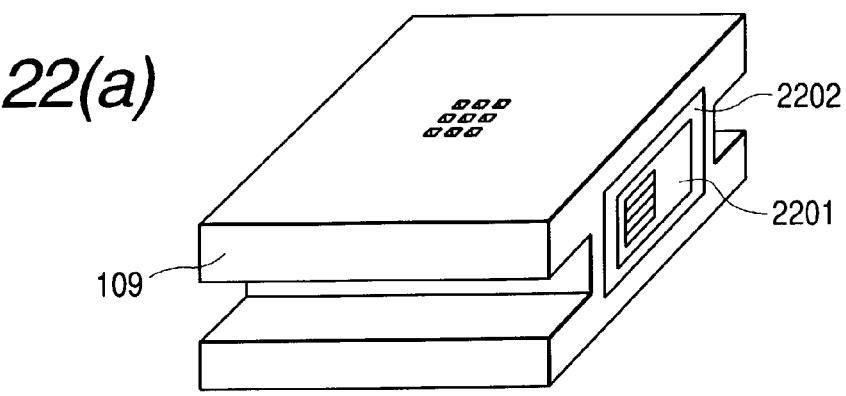
FIGS. 22(a) to 22(c) are diagrams for explaining an example of information management of the micro-sample storage by a memory card.
Figure 22B:
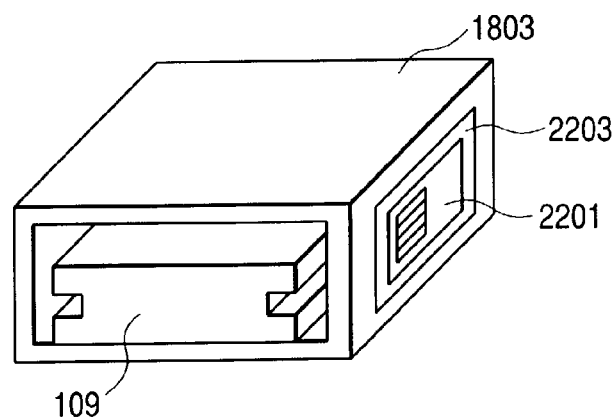
Figure 22C:
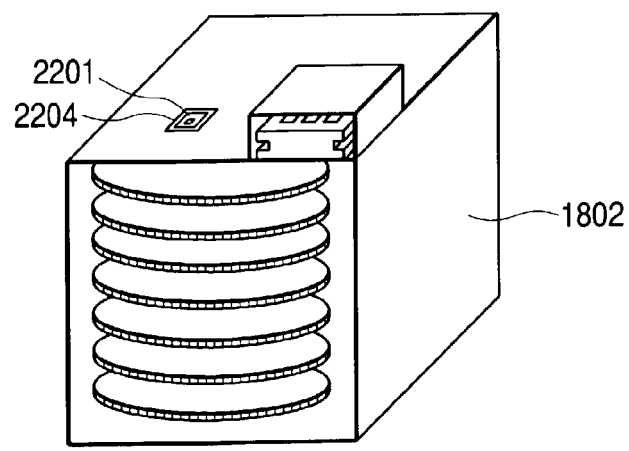

It is also possible to employ a form of writing information corresponding to a process tag into a memory card such as a flash memory in place of a process tag and providing memory card holders 2202, 2203, and 2204 for holding memory cards 2201 shown in FIGS. 22(a), 22(b), and 22(c) corresponding to the forms of FIGS. 21(a), 21(b), and 21(c), respectively. In this case, a terminal such as a reader/writer capable of reading and writing process information or the like of the memory card 2201 is prepared in a place accessed by the process operator.

Figure 23A:
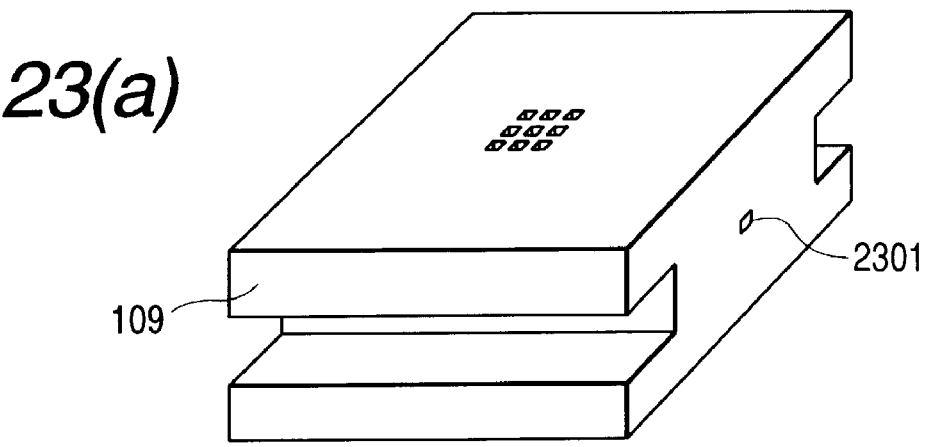
FIGS. 23(a) to 23(c) are diagrams for explaining an example of information management of the micro-sample storage by a non-contact IC chip.
Figure 23B:
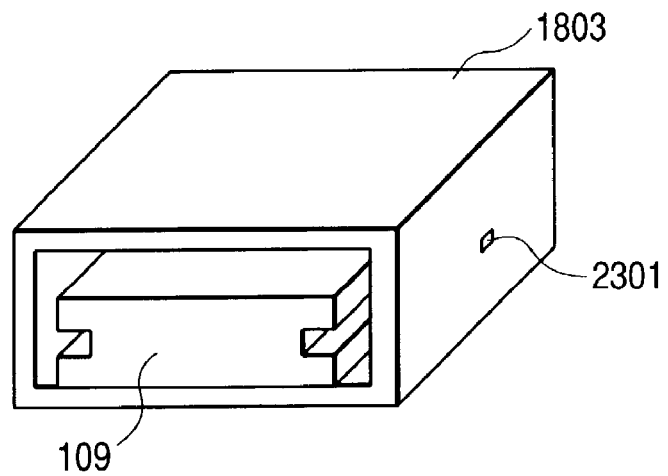
Figure 23C:
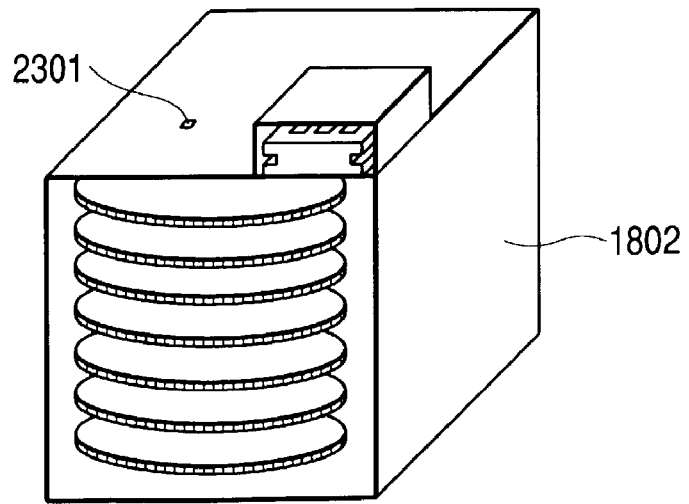
Figure 24:
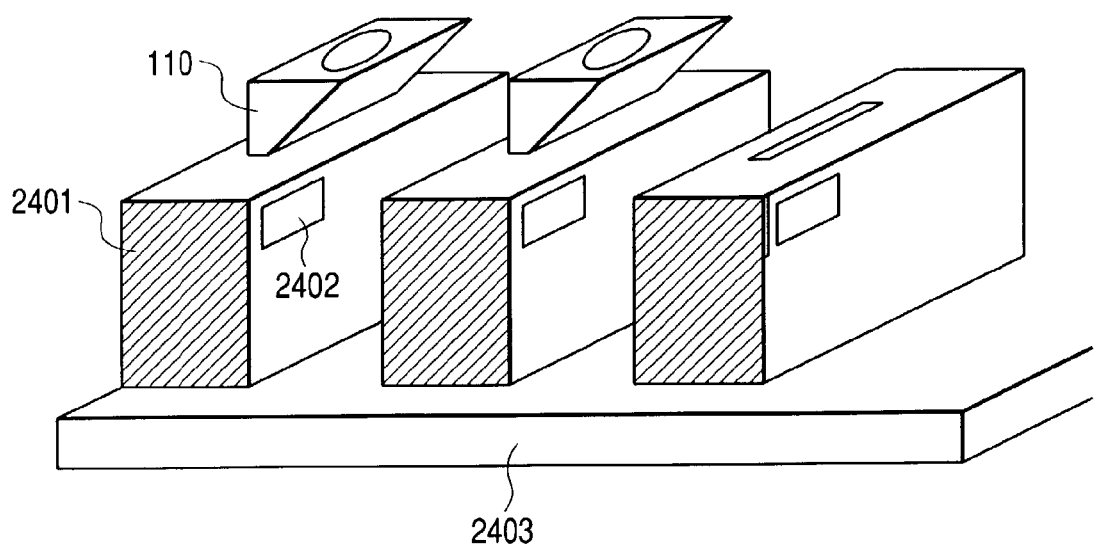
FIG. 24 is a diagram for explaining an example of management of an individual micro-sample by a non-contact IC chip.

Similarly, there are also methods of using non-contact IC chips 2301 of FIGS. 23(a), 23(b), and 23(c) corresponding to the forms of FIGS. 21(a), 21(b), and 21(c), respectively. A non-contact IC chip is a chip which has a size of about 0.4 mm and in which an RF analog circuit and a memory are integrated. In the non-contact IC chip, a single (unique) numerical value is recorded. A data base in which the numerical value and micro-sample information (process flow, process parameters (temperature, time, and the like), process date and time, wafer lot number, micro-sample extracting process, micro sample extraction lot, micro-sample extraction-wafer, micro-sample extraction chip, micro-sample extraction bit address, micro-sample extraction direction, micro-sample storage number, micro-sample storage hole number, and the like) are associated with the apparatus 104 for filing data of stored-sample is configured. In such a manner, only by reading the numerical value written in the non-contact IC chip, the information of the micro-sample can be promptly obtained.

Since the non-contact IC chip is small and cheap, the invention is not limited to the form of providing one non-contact IC chip for one micro-sample storage 2403, but it is also possible to employ a form of providing a micro-sample storage part (for example, 2401) for each micro-sample (for example, 110) and a non-contact IC chip (for example, 2402) is attached to each micro-sample storage part. In this case, a micro-sample and stored data correspond to each other in a one-to-one manner as hardware and data, so that management becomes reliable.

As described above, the wafer process information and the micro-sample extraction information are managed, an observation position by inspection information is determined, and a sample to be observed is prepared, thereby increasing reliability of management of failure analysis data and facilitating clarification of the cause of a failure.

An efficient shape of a probe for carrying a micro-sample in the system for failure analysis according to the invention will now be described.

Although the case of using ion beam assisted deposition for fixing the probe and the micro-sample has been described above, in this case, the probe is damaged by ion beam sputtering at the time of separation. On the other hand, there is a tweezers-type probe 2501 shown in FIGS. 25(*a*) and 25(*b*) in a nondestructive, more-efficient probe form. The tip of the probe is forked and a micro-sample is sandwiched by utilizing the elastic deformation the probe.

Figure 25A:
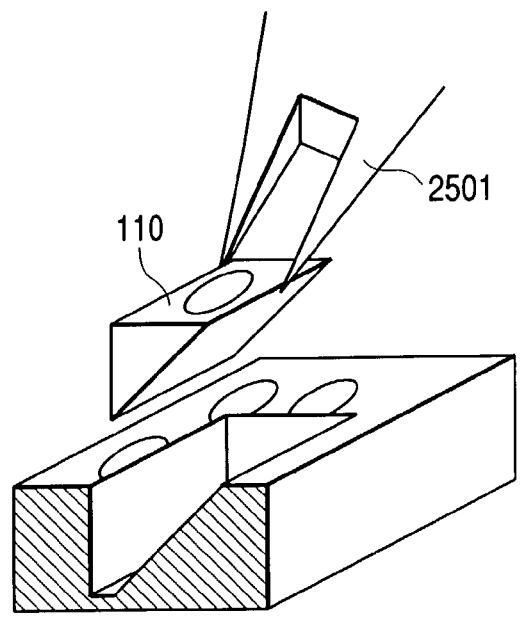
FIGS. 25(a) and 25(b) are diagrams for explaining an example of carriage of the micro-sample by a tweezers-type probe.
Figure 25B:
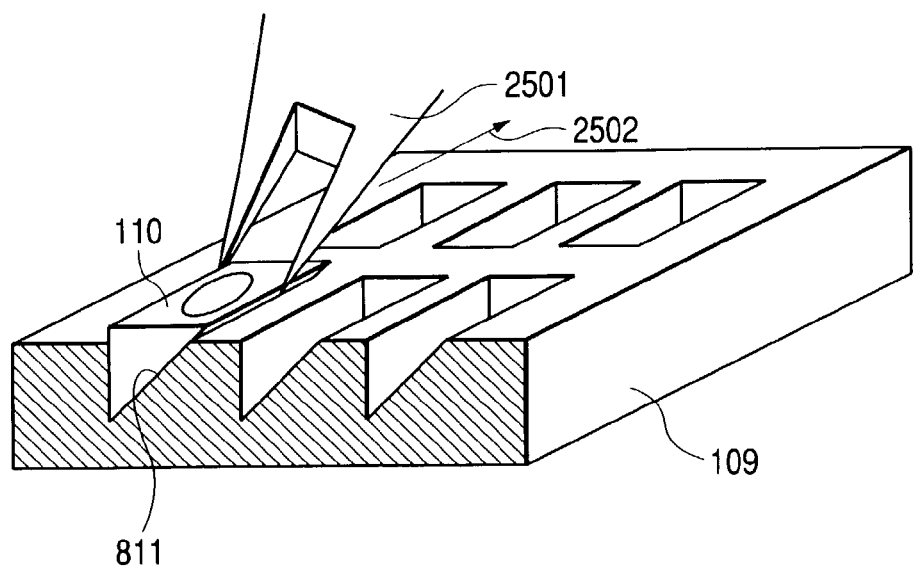

The micro-sample 110 extracted as shown in FIG. 25(*a*) is carried to the micro-sample storage 109 shown in FIG. 25(*b*) and inserted into the storage hole 811. The tweezers-type probe 2501 is pulled out in the direction of the arrow 2502 to be thereby separated, and the micro-sample 110 remains in the storage hole 811. At the time of taking the micro-sample 110 again, the micro-sample 110 is held again by the elastic deformation of the tip of the tweezers-type probe 2501 and carried to the micro-sample holder.

By using the tweezers-type probe as described above, the micro-sample can be stored and taken out again efficiently without destroying the probe.

The procedure of applying the system for failure analysis according to the invention to a product history investigation will be described hereinbelow.

Figure 26:
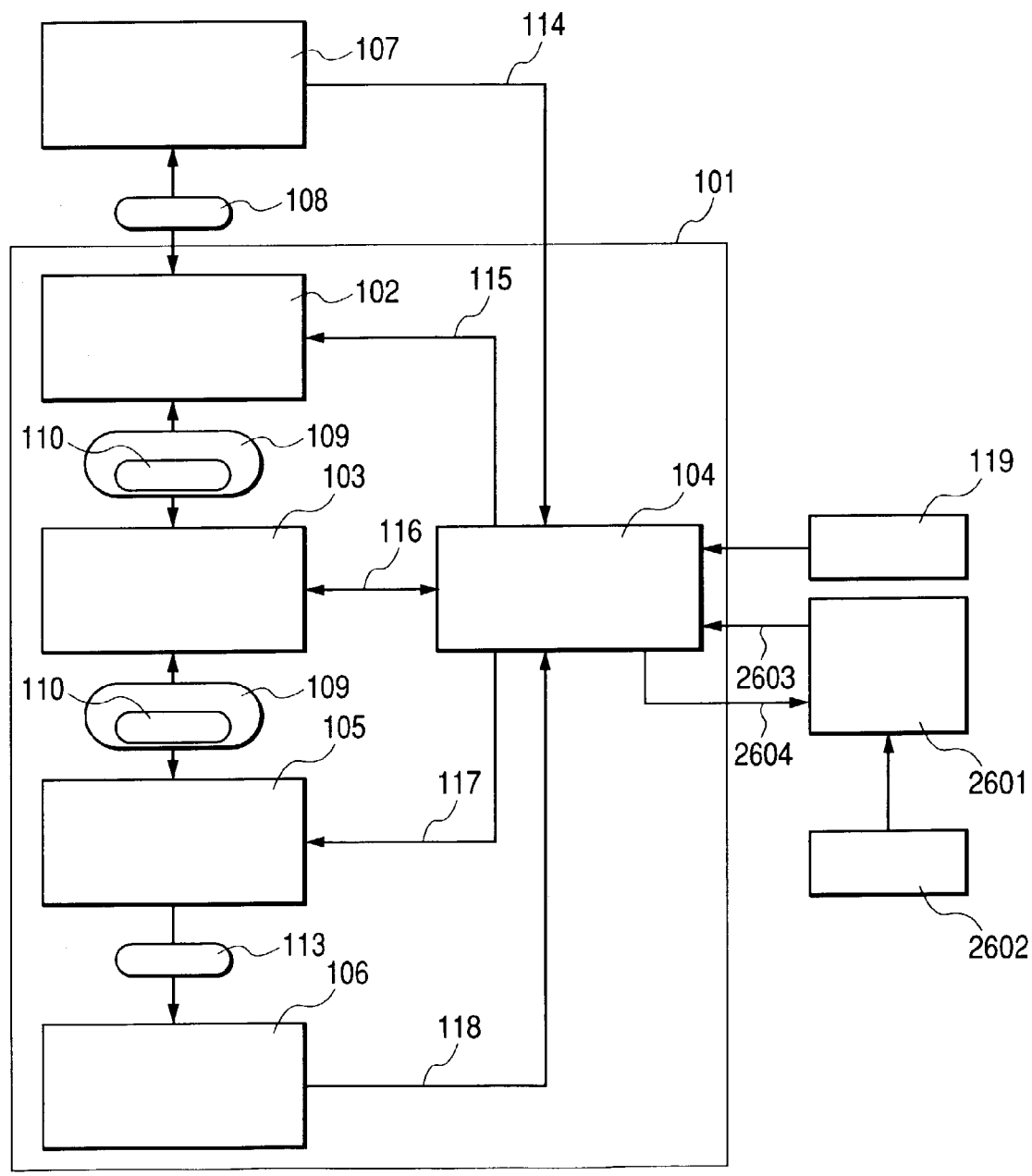
FIG. 26 is a diagram for explaining an example of the configuration of a system for failure analysis applied to product history investigation.

FIG. 26 shows the configuration of the system for failure analysis and the flow of information. Although the configuration is the same as that of FIG. 1, in the case of the example, a failure found after shipment of a product is a target. Therefore, all of micro-samples extracted from the original wafer of a chip already shipped as a product are stored in the apparatus 103 for micro-sample storage. In the case where a failure is found after shipment of a product device, when information 2602 of product failure is input to a product data base 2061, a corresponding product and wafer name and, further, a process and an observation position having high possibility as the cause of the failure (for example, a gate perpendicular section after a wiring process) are determined, and this selection information 2603 is input to the apparatus 104 for filing data of stored-sample. The apparatus 104 for filing data of stored-sample detects the storage position of a corresponding micro-sample from the micro-sample data base.

In such a manner, failure analysis is conducted in a manner similar to the embodiment of the invention and the cause of a failure is specified. Analysis information 2604 (including an image and the like) is also transmitted to the apparatus 104 for filing data of stored-sample and stored. The analysis information 2604 is transmitted to the product data base 2601 and managed together with the initial information 2602 of product failure. The cause of the failure specified as described above is used for explanation to the customer of the product.

As described above, the cause of a failure in a corresponding process can be clarified even after shipment of the product by the system for failure analysis, and it is effective to explain the situation to the customer.

The procedure of applying the system for failure analysis according to the invention to acquisition of support data of an advanced process control will now be described.

The advanced process control (APC) is a method of setting multivariable process parameters to thereby manage a change in the yield and predicting a process parameter by which the yield is improved, thereby optimizing the parameter. In this case, depending on the setting of the parameters, there is the possibility that the parameters are largely deviated from the optimum parameters and an effective advanced process control is not achieved. In order to limit the direction and the range of setting the process parameters, support data is obtained as described below by the system for failure analysis.

Figure 27:
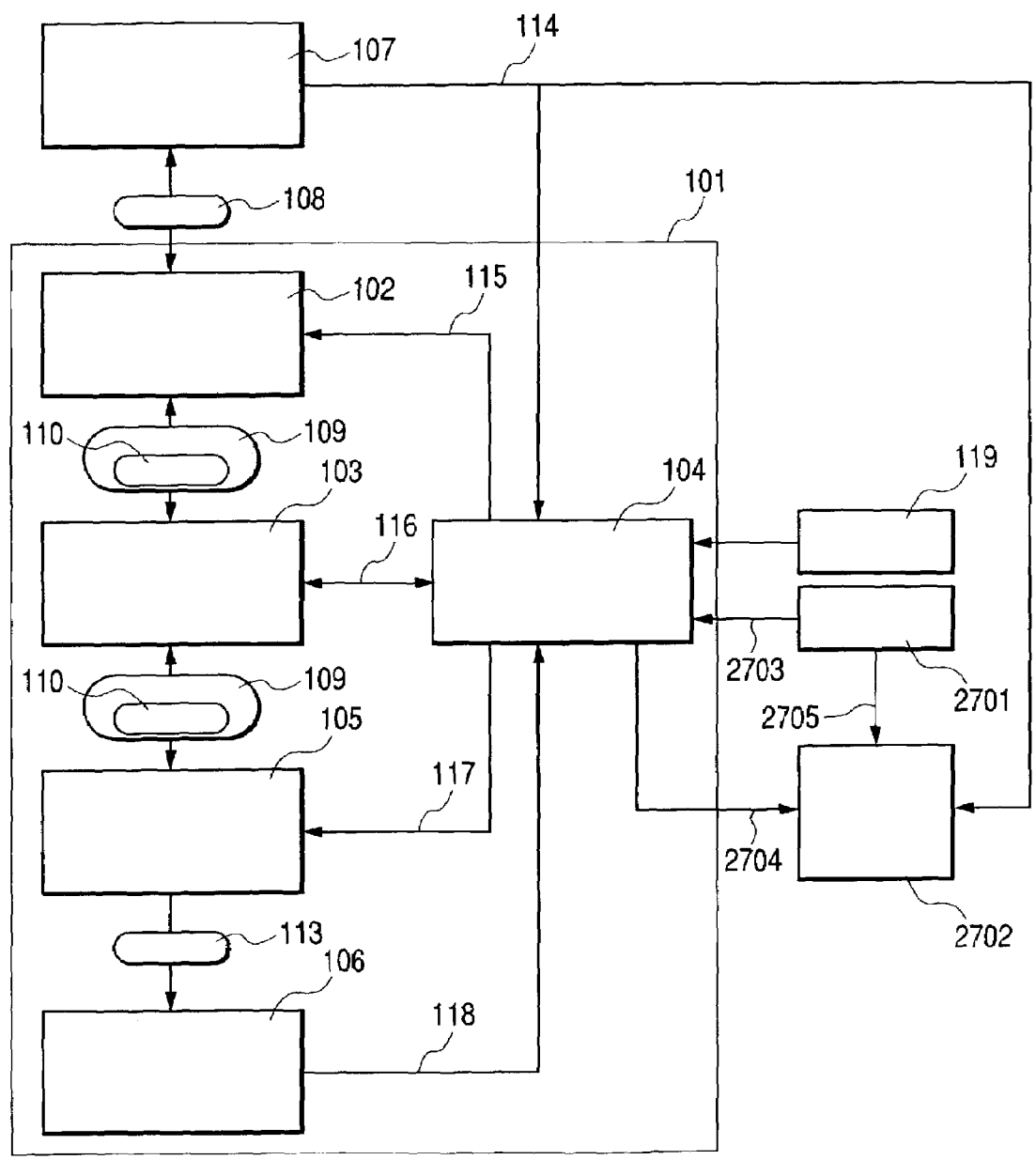
FIG. 27 is a diagram for explaining an example of the configuration of the system for failure analysis applied to generation of a process control support data base.

FIG. 27 shows the configuration of the system for failure analysis and the flow of information. The flow up to the storage of the micro-sample is similar to that in the foregoing embodiment. After that, the wafer is inspected by an inspection apparatus 2701. By using a preset threshold, a wafer and a process which are determined as defective and, further, an observation position in which the possibility that a failure is observed is high are determined. This selection information 2703 is input to the apparatus 104 for filing data of stored-sample. The apparatus 104 for filing data of stored-sample identifies the storage position of a corresponding micro-sample from the data base.

The failure analysis is conducted in a manner similar to the foregoing embodiments and the cause of a failure is specified. The analysis information (including an image) is also transmitted to the apparatus 104 for filing data of stored-sample and stored. This analysis information 2704 is transmitted together with the process information 114 and inspection information 2705 of a failure sample to a failure data base 2702 and stored. From the failure data base 2702, a process parameter in which a failure easily occurs is specified easily.

As described above, by the system for failure analysis, a process parameter in which a failure easily occurs is easily specified, so that the direction of setting a parameter in the advanced process control can be limited and the efficiency is accordingly increased.

An example of the system for failure analysis for monitoring the details that, in a position determined as an abnormal part by an initial wafer inspection, a failure occurs in a later process.

Figure 28:
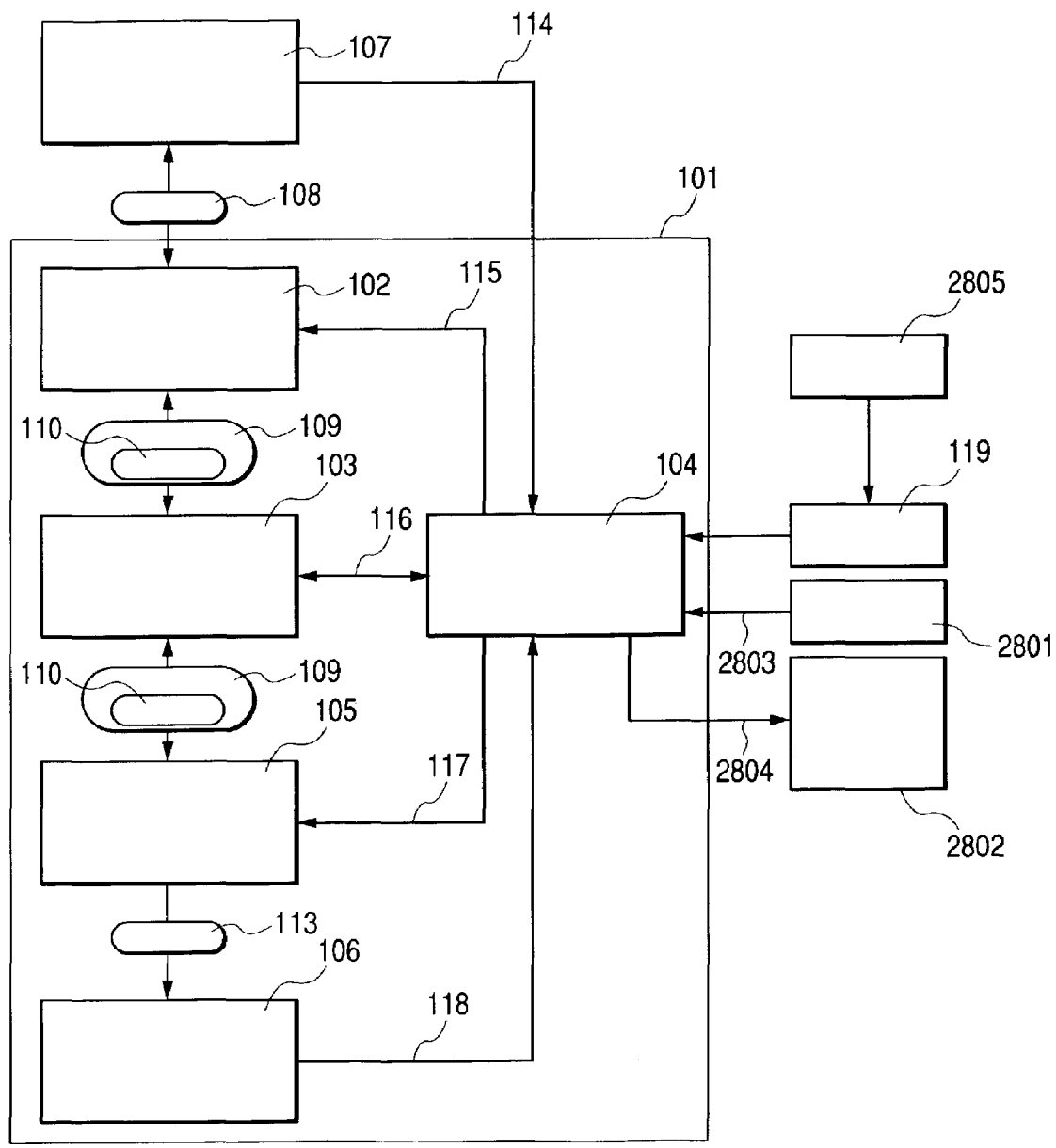
FIG. 28 is a diagram for explaining an example of the configuration of the system for failure analysis in the case of monitoring the details of a cause of a failure by paying attention to an abnormal portion.

FIG. 28 shows the configuration of the system for failure analysis and the flow of information. In the foregoing embodiment, as the extraction position of a micro-sample, a proper position is preset as described above. In the case of the example, the extraction position is determined from an inspection result of an inspection apparatus 2805.

Figure 29A:
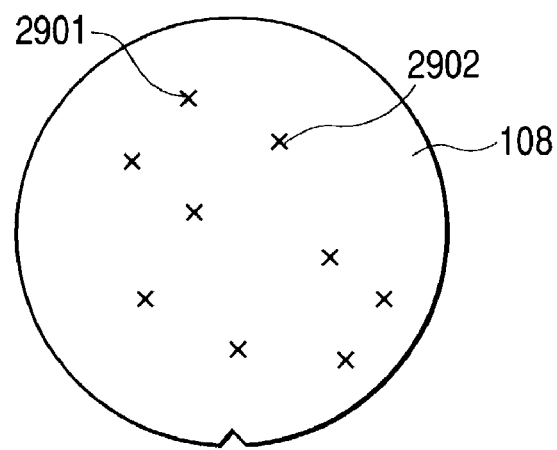
FIGS. 29(a) to 29(c) are diagrams for explaining selection of a micro-sample extraction position in the case of extracting a micro-sample by paying attention to an abnormal portion.
Figure 29B:
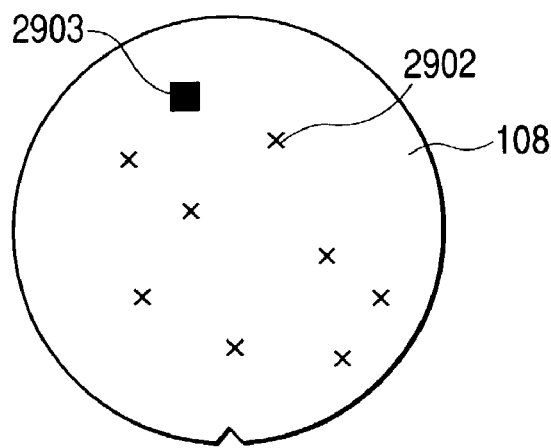
Figure 29C:
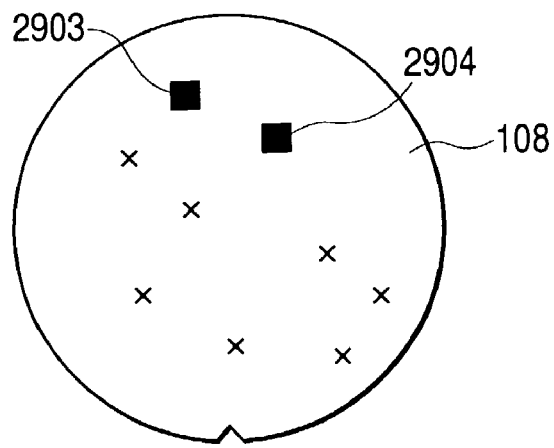

The determination of the position will be described by referring to FIGS. 29(*a*) to 29(*c*). For example, FIG. 29(*a*) shows a result of a foreign matter inspection of a wafer. The x marks of points 2901, 2902, . . . indicate positions where foreign matters are observed. Foreign matters are particularly narrowed to those which are considered to be similar from the viewpoints of size and the like. The information 119 of the positions as positions in which micro-samples are extracted after the subsequent selecting process is input to the apparatus 104 for filing data of stored-sample. According to the information, for example, from a wafer subjected to a certain process, an area 2903 including the point 2901 is extracted as shown in FIG. 29(*b*). From the wafer subjected to the following selecting process, an area 2904 including the point 2902 is extracted as shown in FIG. 29(*c*). In such a manner, micro-samples are sequentially stored. After that, in response to a failure analysis requirement 2801, selection information 2803 of a micro-sample is input to the apparatus 104 for filing data of stored-sample. The apparatus 104 for filing data of stored-sample identifies the storage position of a corresponding micro-sample from a data base.

Failure analysis is conducted in a manner similar to the foregoing embodiments and the cause of the failure is specified. The analysis information (including an image and the like) is also transmitted to the apparatus 104 for filing data of stored-sample and stored. Analysis information 2084 is transmitted to an apparatus 2802 for filing a data base of failures and stored. From the failure data base 2802, information of a possible failure in a corresponding process, which is caused by an abnormal part detected in an initial inspection, can be obtained.

As described above, the cause of a failure when an initial abnormal part is noted can be specified by the system for failure analysis, so that process management parameters can be easily grasped.

As described specifically above, according to the invention, a sample at the time of a process which is finished before can be assured, so that an observation image in a target position which is not influenced by a later process can be obtained, and efficiency of finding out the cause of a failure can be increased.

According to the invention, a failure analysis technique capable of obtaining an observation sample corresponding to an arbitrary observation desired position determined by an inspection later in failure analysis of a device and the like can be realized.

What is claimed is:

1. A system for failure analysis, comprising:
   an apparatus for sample extraction for extracting, as a sample, a part of a substrate by an ion beam process after each of two or more different processes for forming a desired circuit pattern on said substrate, and carrying said sample to a sample storage for storing said sample;
   an apparatus for filing data of a stored sample for constructing a data base in which at least product name of said substrate, substrate name, and process name are associated with a storage position of said sample;
   an apparatus for sample storage for storing said sample storage extracted in accordance with the data base of said apparatus for filing data of the sample and selecting said sample corresponding to arbitrary product designation after completion of the product of said sample;
   an apparatus for performing an additional processing of said sample for taking out said sample selected in response to a failure analysis request and performing an additional process on the basis of additional process information; and
   an apparatus for failure analysis for analyzing said sample subjected to the additional process.

2. A system for failure analysis, comprising,
   an apparatus for sample extraction for extracting a sample from a substrate by an ion beam process after each time an arbitrary process for forming a desired pattern on said substrate is finished, and carrying said sample to a sample storage for storing said sample;
   an apparatus for filing data of a stored sample for constructing a data base in which at least product name of said substrate, substrate name, and process name are associated with a storage position of said sample;
   an apparatus for sample storage for storing said sample extracted in correspondence with the data base of said apparatus for filing data of the sample;
   an apparatus for performing an additional processing of said sample for taking out said selected sample from said sample storage and performing an additional process on the basis of additional process information; and
   an apparatus for failure analysis for analyzing said sample subjected to the additional process;
   wherein said apparatus for sample storage stores said sample extracted in correspondence with the data base of said apparatus for filing data of stored-sample and selects said sample corresponding to said substrate determined as defective on the basis of a preset threshold in a failure inspection performed after at least two processes.

3. The system for failure analysis according to claim 2, further comprising an apparatus for filing a data base of failures for filing data of observation or analysis of the structure of said sample obtained from said apparatus for failure analysis as failure sample data in correspondence with a process parameter of said process.

4. A system for failure analysis, comprising:
   an apparatus for sample extraction for extracting a sample from a substrate by an ion beam process after each time an arbitrary process for forming a desired pattern on said substrate is finished, and carrying said sample to a sample storage for storing said sample;
   an apparatus for filing data of a stored sample for constructing a data base in which at least product name of said substrate, substrate name, and process name are associated with a storage position of said sample;
   an apparatus for sample storage for storing said sample extracted in correspondence with the data base of said apparatus for filing data of the sample;
   an apparatus for performing an additional processing of said sample for taking out said selected sample from said sample storage and performing an additional process on the basis of additional process information; and
   an apparatus for failure analysis for analyzing said sample subjected to the additional process;
   wherein the material for forming said sample storage is silicon.

* * * * *